United States Patent [19]

Tahara et al.

[11] Patent Number: 6,134,580
[45] Date of Patent: *Oct. 17, 2000

[54] DATA-PROCESSING APPARATUS, DATA-PROCESSING METHOD, AND STORAGE MEDIUM ONTO WHICH IS STORED A DATA-PROCESSING PROGRAM

[75] Inventors: Yasuyuki Tahara; Akihiko Ohsuga, both of Kawasaki; Yasuo Nagai, Hachiouji; Akira Kagaya, Yokohama; Masanori Hattori, Fuchu; Yutaka Irie, Kawasaki; Shinichi Honiden, Tokyo, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/931,509

[22] Filed: Sep. 16, 1997

[30] Foreign Application Priority Data

Sep. 17, 1996 [JP] Japan .................................. 8-244688
Jul. 1, 1997 [JP] Japan .................................. 9-176181

[51] Int. Cl.$^7$ ........................................................ G06F 13/00
[52] U.S. Cl. ............................ 709/202; 709/303; 709/304
[58] Field of Search ................................... 709/202, 303, 709/304, 201, 300

[56] References Cited

U.S. PATENT DOCUMENTS

| 5,155,808 | 10/1992 | Shimizu ................................. | 709/202 |
| 5,337,360 | 8/1994 | Fischer .................................. | 709/202 |
| 5,603,031 | 2/1997 | White et al. . | |
| 5,603,054 | 2/1997 | Theimer et al. ......................... | 709/202 |
| 5,638,494 | 6/1997 | Pinard et al. ............................ | 709/202 |
| 5,768,506 | 6/1998 | Randell .................................. | 709/202 |
| 5,790,789 | 8/1998 | Suarez .................................... | 709/202 |
| 5,822,585 | 10/1998 | Noble et al. ............................ | 709/304 |

FOREIGN PATENT DOCUMENTS 7-182174   7/1995   Japan .

OTHER PUBLICATIONS

O. Etzioni et al., "A Softbot–Based Interface to the Internet", Comm. Of ACM, 37(7), pp. 72–77, 1994.

Encyclopedia of Artificial Intelligence, vol. 2, "Planning", John Wiley & Sons, Inc., S.C. Shapiro et al., pp. 748–757, 1987.

Silva et al., "Interleaving real–time multi–agent planning and execution: an application", Tools with Artificial intelligence, 1994. Proceedings., Sixth International Conference, pp. 756–759, Nov. 1994.

Johansen et al., "Operating system support for mobile agents", Hot Topics in Operating Systems, 1995. (HostOS–V), Proceedings., Fifth Workshop, pp. 42–45, May 1995.

Domel, P., "Mobile Telescript agents and the Web", Compcon '96. 'Technologies for the Information Superhighway' Digest of Papers, pp. 52–57, Nov. 1994.

(List continued on next page.)

*Primary Examiner*—Zarni Maung
*Assistant Examiner*—Almari Romero
*Attorney, Agent, or Firm*—Finnegan, Henderson, Farabow, Garrett & Dunner, L.L.P.

[57] ABSTRACT

In a data-processing apparatus, in local information storage L and R at each node, local information for the purpose of accessing a constituent element is stored, this information being updated. A plan is generated that represents the action that should be taken by an agent in order to satisfy request code that has been input, this being generated as a set of actions, based on agent information and local information. The operation of the agent is implemented at the nodes L and R, based on the various actions that make up the thus-generated plan, and an agent is migrated to another node, based on a go action within the plan. It is possible to perform replanning and generation of a child agent at a migration destination node, if necessary, because of the failure of plan execution, for example.

44 Claims, 22 Drawing Sheets

OTHER PUBLICATIONS

Etzioni et al., "The Softbot Approach to OS Interfaces", IEEE Software, Jul 1995, vol. 12, No. 4, p: 42–51.

Domel, "Mobile Telescript Agents and the Web", Digest of Papers. Compcon '96. Technologies for the Information Superhighway, 1996, p: 52–57.

Penberthy et al., "UCPOP: A Sound, Complete, Partial Order Planner for ADL", Principles of Knowledge Representation and Reasoning: Proceedings of the Third International Conference, Oct. 1992, p: 103–114.

Artsy et al., "Designing a Process Migration Facility The Charlotte Experience", Computer, vol.22, No. 9, Sep. 1989, p:47–56.

Kaneda et al., "Multi–Agent Programming System on a Workstation Network", IEEE, May 1995, p:315–318.

*FIG. 12*

| GOAL | SCRIPT | SCRIPT VARIABLES AND VALUES | SCRIPT EXECUTION POSITION |
|------|--------|-----------------------------|---------------------------|

DATA-PROCESSING APPARATUS, DATA-PROCESSING METHOD, AND STORAGE MEDIUM ONTO WHICH IS STORED A DATA-PROCESSING PROGRAM

BACKGROUND OF THE INVENTION

1. Field of the Invention

The present invention relates to a data-processing apparatus which processes information that exists in distributed form on a network, and to an improvement in a data-processing method.

2. Description of Related Art

In recent years, in the field of data-processing focused on the use of computers, there has been a trend to downsizing and to the implementation of network environments such as the Internet. As a result, the chiefly used data-processing hardware and methods have exhibited a shift to a distributed system in which constituent elements such as data files and function libraries are distributed among each of the machines on the network. With this change, there has been progress in implementing an open system environment in connection with wide area networks, even in the case of private companies and laboratories. Such networks which are connected to wide area networks are known as open networks.

In a large-scale network such as is typical of open networks, it often occurs that a single unit of software will be made up of a combination of constituent elements such as data files and function libraries that are distributed among a plurality of machines. Software configured in this manner is known as a distributed system. In view of the control situation of various machines, or nodes, and the control aspects of the network, it can be envisioned that constituent elements that are disposed in a distributed manner might be migrated to another machine or directory on the network, with a change in properties such as the associated names and access privileges. The following problems arise because of such changes.

Firstly, when requesting a piece of software to perform processing, request code such as a message or a command is input, and when making this input, a specific constituent element related to processing at a given machine is specified. However, when the specified constituent element is migrated to another machine, to specify a new machine at the migration destination, it is necessary to re-perform or modify the input with respect to the software. In particular in the case in which a part of the software is configured so as to access a migrated constituent element, the migration of the constituent element is equivalent to changing the configuration of the software itself. In this case, it is necessary to change the part of the software that is performing the accessing, and to specify the new machine at the migration destination.

In the past, because of explicit name-specification with respect to machines, functions, files and the like, when a function or a file was migrated, it was necessary to change the software or input to accommodate the change. Additionally, this type of specification needed to be made before the start of processing.

In a distributed system, in order to provide service to a user reliably, it is important to build flexible software that can adapt to such changes. It is particularly desirable to be able to adapt automatically, without human intervention if at all possible, even after the start of processing.

In a network, agent-oriented technology has gain attention in recent years as a technique for achieving this flexible software architecture, and many implementations of this have been attempted. Agent-oriented technology is a software-development technology which seeks to configure software in units of agents, the term agent in this case being the processing unit of the software, which independently and flexibly adapts to a change in the environment.

For example, in Japanese Unexamined Patent Application publication H7-182174, there is a disclosure of a method of implementing remote programming. Remote programming is programming in which, in a distributed system, an agent is migrated from a node at which processing was started (known as the local machine) to another node (known as the remote machine).

To make use of an agent, instructions and internal information are required. Instructions are used to code the operation (behavior) of the agent, and internal information is the information that is operated upon by the operation of the agent. More specifically, this internal data includes, in addition to variables and arrays, stacks, buffers, queues, flags and the like, which make up all the information required for operation of the agent. Taken together, instructions and internal information form what is known as agent information.

Instructions are coded in units of various operations, such as opening and closing of files. In remote programming, there is a special instruction, which is a go operation. The go operation causes processing which migrates an agent to a remote machine, and if during processing an instruction with respect to a file that is resident on a different machine, for example, before that instruction a go must be coded and executed.

Another example of a technology of the past for the purpose of performing processing which spans between a plurality of nodes of a network is the following (refer to Oren Etzioni and Daniel Weld "A Softbot-Based Interface to the Internet" (Communications of ACM)). In this technology, the, usual network functions such as ftp, which performs file transfer, and telnet, which provides a virtual terminal function for remote log-in, are used to perform processing which spans across a plurality of machines. Based on information which is collected during operation, automatic trial-and-error use is made of each function under software control so as to perform flexible planning in accordance with conditions, thereby performing function selection that accommodates configuration changes such as changes in files.

For example, in the case in which a desired function is transferred to another node, because an attempt to access that function at the node before the transfer will result in failure, planning is performed at the original machine (node), the access destination being changed to the second candidate and access being performed again. According to this technique, it is possible to perform flexible operation in accordance with conditions at various points in time in the system. The use of telnet, ftp and the like is held to within a range that has been pre-determined to be compatible.

However, the following problems arise with the above-described technology of the past. Firstly, in the remote programming method (Japanese Unexamined Patent Application publication H7-182174), because all users needed to code the agent operating series as instructions, the task of programming was troublesome, and there were limits to agent flexibility. Additionally, to accommodate a change in the constituent elements of the software, such as when migrating an agent in response to a go operation, or to change a node name (identifier on the network) of a machine at which an element that was to be used, it is necessary to become aware of this type of change, but there was no means provided in the past to accommodate this type of change. Furthermore, to accommodate a change in a constituent element, it is necessary to make an accommodating instruction change. In the past, however, because the access destination machine name was specified explicitly, in cases in which achievement of a purpose was not possible without changing the access destination, it was impossible at that point to change the instruction. For this reason, there was a need for a technique to flexibly accommodate a change in a constituent element. Because the frequency of changes increased the larger the scale of the network becomes, there was a particularly strong need for a method of accommodating such changes such as open networks.

In the method of Etzioni et al, there is a need during processing to continue mutual access between the local machine and the remote machine, and to perform continuous exchange of information therebetween. For this reason, if a line fault occurred during processing, causing a cutoff of the access route, it was not possible to continue normal access. Also, in the case in which the information content at a remote node is being frequently accessed in small quantities, or in which it is necessary to make a large number of accesses of the information at a remote node, and in the case in which processing must be done to a degree in real time, there are cases in which it is better to perform information processing as a process on the remote machine.

The present invention was proposed to solve the problems of the prior art as described above, and has as an object the provision of data-processing apparatus and data-processing method that flexibly accommodate a change in a constituent element of software and that provide superior immunity to line faults. More specifically, an object of the present invention is to establish the behavior of the agent, which is the executed element, in accordance with a plan that is generated based on information with regard to the constituent elements of the software. Another object of the present invention is to generate a plan efficiently, by connecting actions, based on pre-conditions and post-conditions for each action. Yet another object of the present invention is to make effective use of system resources and parallel processing, by implementing an agent as a process.

Still another object of the present invention is to provide a data-processing apparatus and a data-processing method capable of flexible operation. Yet another object of the present invention is to provide a data-processing apparatus and a data-processing method that process with superior efficiency. More specifically, this object of the present invention is to achieve flexible data processing by performing plan generation for even a node that is a transfer destination. Yet another object of the present invention is to improve the efficiency of plan generation by separating the information used in plan generation into a plurality of fields, and by using only information in fields which correspond to the type of the agent. Still another object of the present invention is the facilitation of the accommodation of a failure in migrating, by appending a pre-condition to a transfer command. Yet another object of the present invention is to continue smooth data processing even by re-generating a plan in the even that a plan execution or transfer fails.

SUMMARY OF THE INVENTION

To achieve the above-noted objects, one aspect of the present invention is a data-processing apparatus, wherein an executable process of software performs data processing at a certain node of a network having a plurality of nodes, the above-noted apparatus comprising: first storage means for storing a first information representing a state of constituent elements of the above-noted node to be accessed by the above-noted executable process; second storage means for storing a second information representing actions of the above-noted executable process; plan-generating means for generating a plan representing a series of actions of the above-noted executable process using the above-noted first and second information in response to a given request code; execution means for executing the above-noted series of actions of the above-noted executable process to the above-noted constituent elements based on the above-noted generated plan; and control means for migrating the above-noted executable process from the above-noted node to another node in response to a certain result of the execution by the above-noted executable process.

In this aspect of the present invention, constituent elements such as data files and function libraries and the like are distributed among various nodes on the network. The domain name, node name, directory, and calling procedure for each of the constituent elements are stored as the first information. When there is, for example, a migration of a constituent element to another node, the first information is updated, either manually or automatically. The contents that are to be achieved by means of the data processing, for example a file or search key to be the object of a search, are input as request code. The action of the execution element in order to satisfy this request code is generated as a plan. A plan is a set of actions (processing), and actions include a first action (go action) for the purpose of node migration. By the execution of the first action within a plan, the execution element is migrated to another node (remote machine), the execution of actions and required plan generation being continued at the remote machine. If a given file is an object, specific elements such as what node is to be accessed are established by referencing the first information at the time of generating the plan.

In this manner, in this aspect of the present invention, because the behavior of the execution element is established by the plan, it is not necessary for the user to code the operational series of the execution element, thereby improving the data -processing efficiency.

Specific nodes which are access destinations for each constituent element are established based on the first information at the time of generation of the plan. For this reason, even if there is a change in a function or a file, that change is reflected in the behavior of the execution element. Also, because there is no need to continue the migration of information between the local machine and the-remote machine, processing can continue even in the event of an unexpected change in condition, such as a cutoff of the connection between nodes on the network.

In another aspect of the present invention, the above-noted second storage means comprises: means for storing a set of actions which is the unit for operations of the above-noted executable process; means for storing action information that includes a pre-condition representative of action being executable and a post-condition representative of a change of state caused by execution; means for storing a prescribed limitation condition of execution of the above-noted action; and means for storing information representative of a causal relationship between the above-noted actions, the above-noted plan-generating means comprising means for storing in the above-noted second storage means, for a prescribed action of the above-noted action set, at least one of a new limitation condition and the above-noted information representative of a causal relationship, based on the above-noted action information In the above, it is desirable that the above-noted plan-generating means adding to the above-noted action set an action to migrate executable process to the above-noted another node with the pre-condition of an action that is to be executed at the above-noted another node as a post-condition, sequentially selecting unachieved goals as subgoals, further sequentially selecting actions having post-conditions which achieve the above-noted selected subgoals, and for each such selected action storing in the above-noted second storage means at least one of a new limitation condition and information.

Additionally, it is desirable that the above-noted plan-generating means adds to each the above-noted selected actions, a selected action which sacrifices a pre-condition of another action to the above-noted information corresponding to the above-noted causal relationship.

It is also desirable that the above-noted plan-generating means adds each selected action which sacrifices a pre-condition of another action, and which can be added the above-noted limitation condition which prevents the loss of the above-noted pre-condition before execution of the other action, to the above-noted information representative of the above-noted causal relationship and adds the above-noted limitation condition.

These aspects of the present invention operate as follows. It is possible for an action to executed when the pre-condition is satisfied, the post-condition being generated as a result of this execution. By means of information that represents the causal relationship, an action that causes a target state as a post-condition is connected to a target state, an action which generates a pre-condition for the connected action as its post-condition being further connected. If this connection is repeated in the reverse sequence from that of the execution sequence, an operation series that achieves the desired state is obtained. Thus, according to the present invention, because a plan can be generated in terms of a small-scale processing as a unit, the efficiency of processing is improved.

Another aspect of the present invention is a data-processing apparatus which performs data processing by an agent at a certain node in a network, the above-noted agent being a series of software process, the above-noted apparatus comprising: storage means for storing first information representing a state of resources of the above-noted certain node to be accessed by the above-noted agent and second information defining actions of the above-noted agent; plan-generating means for generating a plan representing a series of actions of the above-noted agent using the above-noted first and second information in response to a given goal; means for executing the above-noted series of actions of the above-noted agent to the above-noted resources based on the above-noted generated plan; and means for migrating the above-noted agent from the above-noted certain node to another node of the network when the result of the execution by the above-noted agent on the above-noted node is not satisfactory.

In this aspect of the present invention, not only does an agent move between nodes based on a plan, but also a further plan is generated at the destination node. For this reason, it is possible to adjust flexibly to the type of processing performed, according to the stage of plan execution and the state of the destination node, thereby improving the efficiency of data processing.

In yet another aspect of the present invention, the above-noted information which is located at each the above-noted node is divided into a plurality of fields by each type of agent, and further wherein the above-noted agent plan is generated based on field information corresponding to the above-noted agent, and migration between nodes being performed so as to make migration of the above-noted agent to the above-noted corresponding field at the above-noted another node.

In this aspect of the present invention, when generating a plan, because only information corresponding to the agent type is used, the amount of searching that is required is reduced, thereby improving the efficiency of plan generation. Even when migrating between nodes, because an agent is migrated to a corresponding field, the same field information is used as before the migration in plan execution and plan generation.

In still another aspect of the present invention, the above-noted agent the above-noted agent has information representative of characteristics state or an action of the above-noted agent, the above-noted information being migrated along with the above-noted agent when migration is made between nodes, the above-noted information being used together with the above-noted first information and the above-noted second information at the above-noted another node to perform planning.

In this aspect of the present invention, because the agent is migrated along with its characteristic information, this information being used at the destination node as well, it is possible to perform planning that is suited to the states and actions of individual agents.

In yet another aspect of the present invention, the above-noted plan-generating means, when generating a migration command that migrates an agent between nodes or another command as part of a plan, appends a pre-condition as a prerequisite to the above-noted migration command or the above-noted other command.

In this aspect of the present invention, a pre-condition is appended to a command as a basis. In the case in which a migration based on a migration command fails, there is a possibility that the pre-condition for the command was not satisfied. Because this pre-condition is appended to migration commands, it can be identified easily by referencing the command, this facilitating both the identification of the cause of the failed migration and the correction of the failed condition.

DESCRIPTION OF THE DRAWINGS

FIG. 12 is a drawing which shows the data structure of a goal script set in the second embodiment of the present invention.

DETAILED DESCRIPTION OF THE PREFERRED EMBODIMENTS

Preferred embodiments of the present invention will now be described in detail, with reference being made to the relevant accompanying drawings. In the embodiments to be described below, the environment is assumed to be a distributed environment comprising a network with a plurality of nodes, in which the term "network" is used with the generally accepted meaning of the system that connects computers, and more specifically with meanings such as the Internet, telephone lines, and the like. The term "node" refers to the agent migration unit. While the basic assumption is made that there is one node at one host, or computer, it is possible for a plurality of nodes to exist. A "distributed environment" is one in which a plurality of computers connected by a network exists, the information held by each of the computers being different.

The embodiments to be described below are implemented by control of a CPU in accordance with a program at a computer, and it is possible to envision a variety of specific methods of implementation. For this reason, the descriptions that follow present the apparatus of the present invention in terms of virtual circuit blocks such as the "XXX section," which correspond to each of the various functions thereof. The CPU makes possible the implementation of the actions of the above-noted virtual circuit blocks, while using various hardware resources of the computer as specified by a program.

Typical examples of hardware resources are a memory that made up of storage elements such as RAM devices, an auxiliary storage device such as a hard-disk drive, an input device such as a mouse or keyboard, an output device such as a display device or printer, these being connected to the CPU via a bus and an input/output control circuit. The computer is connected to the network via a network connection apparatus. It will be apparent to a person skilled in the art that these are merely specific examples of hardware resources, it being possible to use other types of apparatuses for the purpose of achieving specific objects, such as information storage, input, and output.

1. First Embodiment

The following is a description of the first embodiment of a data-processing apparatus, as recited in claims 1 through 11, and a data-processing method, as recited in claims 12 through 14, with reference being made to the relevant accompanying drawings.

(1) Configuration

[Hardware Configuration]

Figure 1:
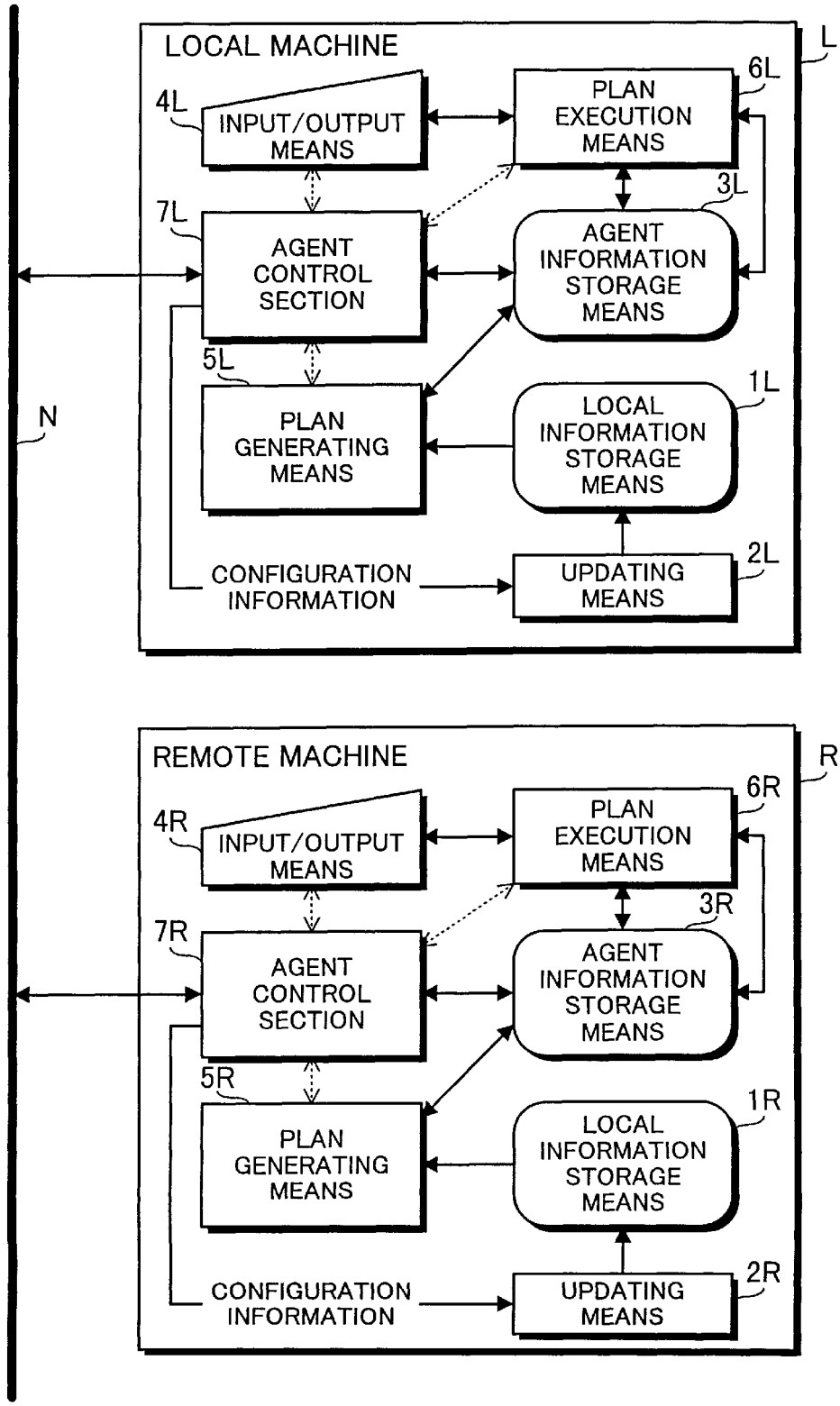
FIG. 1 is a functional block diagram which shows the configuration of a data-processing apparatus according to the first embodiment of the present invention.

FIG. 1 is a block diagram which shows the configuration of this embodiment. As shown in this drawing, in the first embodiment, a plurality of nodes, which includes nodes L and R, are connected to a network N. In this arrangement, request code is input, the node L to which request code is input and at which the processing is started being called the local machine, and the node R which is a destination to which an agent is migrated from the local machine being known as the remote machine. The constituent elements of the software used in information processing are distributed among this plurality of nodes, an agent, which is an execution element of the software being active at one of the above-noted nodes, thereby performing data processing.

Each of the nodes L and R have a local information storage means 1 (1L and 1R, this notation being used hereinafter and corresponding to the above-noted first storage means), which stores local information (corresponding to the above-noted first information) that is used in accessing a constituent element, and an updating means 2, which updates the above-noted stored local information. Each of the nodes L and R has an agent information storage means 3 (which corresponds to the above-noted second storage means) for the purpose of storing agent information (which corresponds to the above-noted second information), and a input/output means 4 (corresponding to the above-noted input/output means for the purpose of inputting input code with respect to data processing). The agent information is information with regard to the behavior of an agent, and is successively updated in accordance with the behavior of the agent itself.

Each of the nodes L and R has a plan generating means 5 (which corresponds to the above-noted generating means) that generates a plan that expresses the action to be taken by an agent for the purpose of satisfying the input request code, this being generated as a set consisting of a plurality of actions. If necessary, actions which are included in the plan generated by the plan generating means 5 include a go action (corresponding to the above-noted first action) for the purpose of implementing a migration of an agent between nodes (claim 2).

Each of the nodes L and R has a plan execution means 6 (which corresponds to the above-noted execution means) which implements the operation of the agent at the nodes 1, and R, based on each action of the above-noted generated plan, and an agent control section 7 (which corresponds to the above-noted control means) which migrates an agent between nodes, based on go action at the plan. The agent control section 7 functions as a judgment means (claim 10) that performs a judgment with regard to the generated plan.

In this embodiment, the major information used are as follows.

[Agent Information] (Second Information)

The agent information is various information which controls the behavior of the agent and which is operated on by that behavior. Specifically, examples of this agent information are a set of actions (hereinafter referred to as an action set), information with regard to each action included in the set (hereinafter referred to as action information), control conditions with regard to safety (hereinafter referred to as safety conditions), and a causal link (corresponding to information which represents the above-noted causal relationship). First, the action set is a list representation of the set of actions that make up the plan which is being generated, an action being the unit of operation that can be performed by an agent.

With regard to each action, there exists action information. Action information includes action code which represents the action name and arguments (parameters), the pre-condition which is the prerequisite necessary for execution of the action, and the post-condition which represents the state change resulting from the execution, all of these being represented as items or item lists.

The safety conditions for each of the actions in an action set are conditions which represent limitations with regard to the sequence of execution between actions, these being represented as a list of pairs of action code. That is, each of the pairs that makes up the safety conditions expresses a limitation that the first element should be executed before executing the second element. There is no relationship between the sequence within the action set and the actual execution sequence, the execution sequence being limited by only the safety conditions.

A causal link with respect to any action that is part of an action set is information which states the casual relationship that the actual execution of one action makes it possible to execute another action, this being in the form of three lists, consisting of action code, an item that represents the fact of that action occurring, and action code that becomes executable because of that fact.

The following is an example of action information.

Action code: grep(File,Keyword)
Pro-condition: [file-exists(File)]
Post-condition: [add(include(File,Keyword))]

In the above example, the action code "grep(File, Keyword)" is the operation called "grep", which is the operation of searching a file having the name "File" to determine whether or not it includes the character string "Keyword" and of implementing the post-condition if the file includes that character. The pre-condition expresses the condition which must be satisfied when that action is to be executed. In this example, the pre-condition "file-exists (File)", which is in the same format as the above-described state code, represents the condition in which a file having the name "File" exists.

The post-condition generally represents a fact that occurs as a result of the execution of an action. In the above example, this occurs only when the character string existed in the file. In the post-condition "add(include(File, Keyword))" in this example, "include(File,Keyword)" represents the fact that the file having the name "File" includes the character string "Keyword". The "add( )" represents the operation of adding the fact included in the parentheses (in this case, "include(File,Keyword)") to the agent as knowledge. To delete knowledge, the operation performed is of the format "del( )".

[Local Information] (First Information)

The local information storage means 1 stores local information. The local information in this embodiment, is information for the purpose of accessing a constituent element, this being expressed as a series of symbols called items. In this embodiment, assume that the state code shown in the example below is stored in the local information storage means 1. The state code is information that represents some fact with regard to a constituent element of software.

maybe(file-exists(file1) at node1)

In this example, "maybe( )" indicates that fact within the parentheses has not been verified. The "file-exists(file1) indicates that a file having the name "file1" exits. The "at node1" which follows indicates that the above-noted fact (the existence of file file1) is at a machine that has the node(name "node1". When the state code is "maybe( )", it is necessary to migrate to the machine node1 to verify whether or not the above-noted fact (the existence of the file file1 at the machine node1) exists. In this case, the node name node1 is a node name on the remote machine R.

The updating of such local information can be done, for example, by the system administrator manually updating the local information when a change is made in a constituent element at any machine. If this is done, it is possible to perform flexible operation by adjusting the contents that are input to suit a specific situation (claim 3).

Local information can also be automatically updated by having a program reference, for example, a file list which describes the network configuration. If this is done, because detection of a change and location information updating are performed automatically, it is possible to eliminate the manual input of information, thereby improving the efficiency of processing (claim 4).

While it can be envisioned that the above-described agent information and local information are stored in the form of text character strings such as noted above, it is also possible to store them, if necessary, in other internal formats, such as by replacing code with reserved words.

(2) Action and Effect

In this embodiment of the present invention configured as described above, data processing is performed in the following manner.

[Request Code Input]

Figure 2:
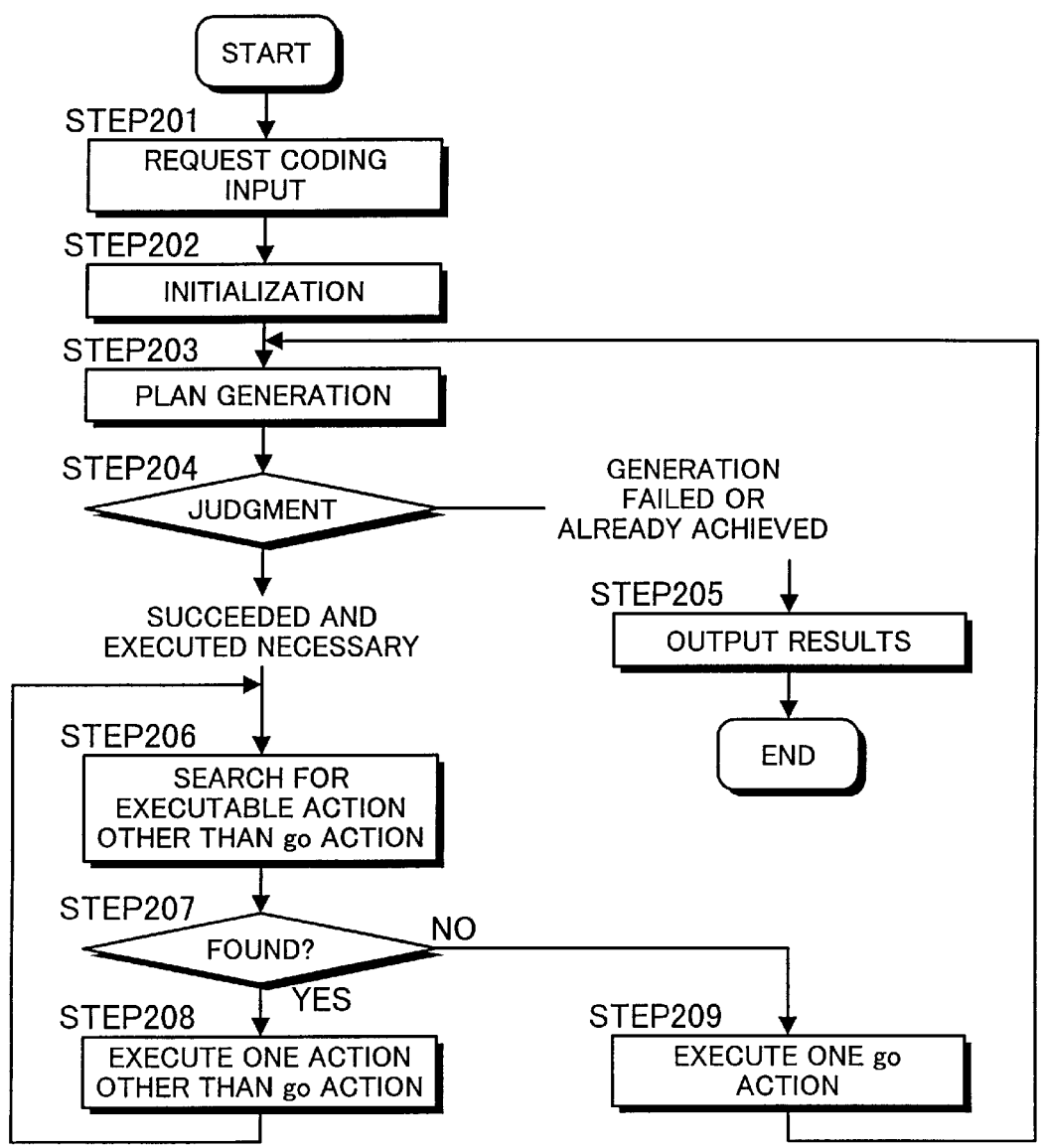
FIG. 2 is a flowchart which shows the operating procedure of data processing in the first embodiment of the present invention.

FIG. 2 is a flowchart that shows the processing procedure for data processing in accordance with this embodiment. First, code for the purpose of achieved a desired state by data processing is input as request code by a user from the input/output means 4 (step 201). The thus input request code is stored in the agent information storage means 3. In this case, the request code is made up of one or a plurality of items. The following is an example of such a request code.

file-exist(File) at Node
include-keyword(File,patent)

In the above example, the "file-exists(File) at Node" of the first line is a request to find a file having the name File on a machine having the node name Node. The second line is a demand that the file File include the keyword "patent". Therefore, this request code represents a request that the network be searched for a file which includes the keyword "patent", with the file name and node name for the search specified.

[Initialization]

Next, the agent control section 7 performs initialization processing (step 202). Specifically, the following information is stored separately as the action set, safety condition, and causal link within the agent information storage means 3, as shown below.

Action set: [*start*, *end*]

Safety condition: [(*start*, *end*)]

Causal link: [ ] (empty list)

Additionally, with respect to the agent information storage means 3, the following information is added and stored as action information. First, of the initialized conditions, a list of conditions other than the condition represented by "maybe( )" (called a maybe condition) is set as a post-condition for an action having the action name of "*start*".

Of the initialized conditions, with respect to a condition of the form "maybe(cond at node)" (where cond and node are the specific condition and name name), the following action information is added.

Action name: go(node)

Pre-condition: [ ]

Post-condition: [add(cond at node)]

That is, this defines a go action having a post-condition that is a condition other than a maybe condition. This indicates that an action which migrates an agent to a specific node is added to the action set as a post-condition, this being the pre-condition for an action that is to perform execution at the specific node.

In this embodiment, for example, the following type of action information is added.

Action name: *start*

Pre-condition: [ ]

Post-condition: [ ]

Action name: go(node1)

Pre-condition: [ ]

Post-condition: [add(file-exists(File) at node1)]

Action name: *end*

Pre-condition: [(file-exists(File) at Node), include-keyword(File,patent)]

(Same as request code)

Post-condition: [ ]

[Plan Generation]

Next, by means of the plan generating means 5, a plan is generated for the purpose of satisfying the request code (step 203, claims 5 through 8, and claim 13). Plan generation is performed by updating action information while referencing local information, the updated action information being the generated plan. With the exception of the part related to migration of an agent, the procedure for generating a plan is performed by a known planning technique (Reference 1: Setsuo Osuga Ed. "Artificial Intelligence Dictionary" pp. 979–988). This planning is the generation of an action plan for the purpose of achieving a given goal with respect to an action element such as a robot, which is capable of changing the external environment. The inputs which are given for the purpose of planning are the initial state of the external environment, various actions (acts) which change the external environment, and one or more goals.

Figure 3:
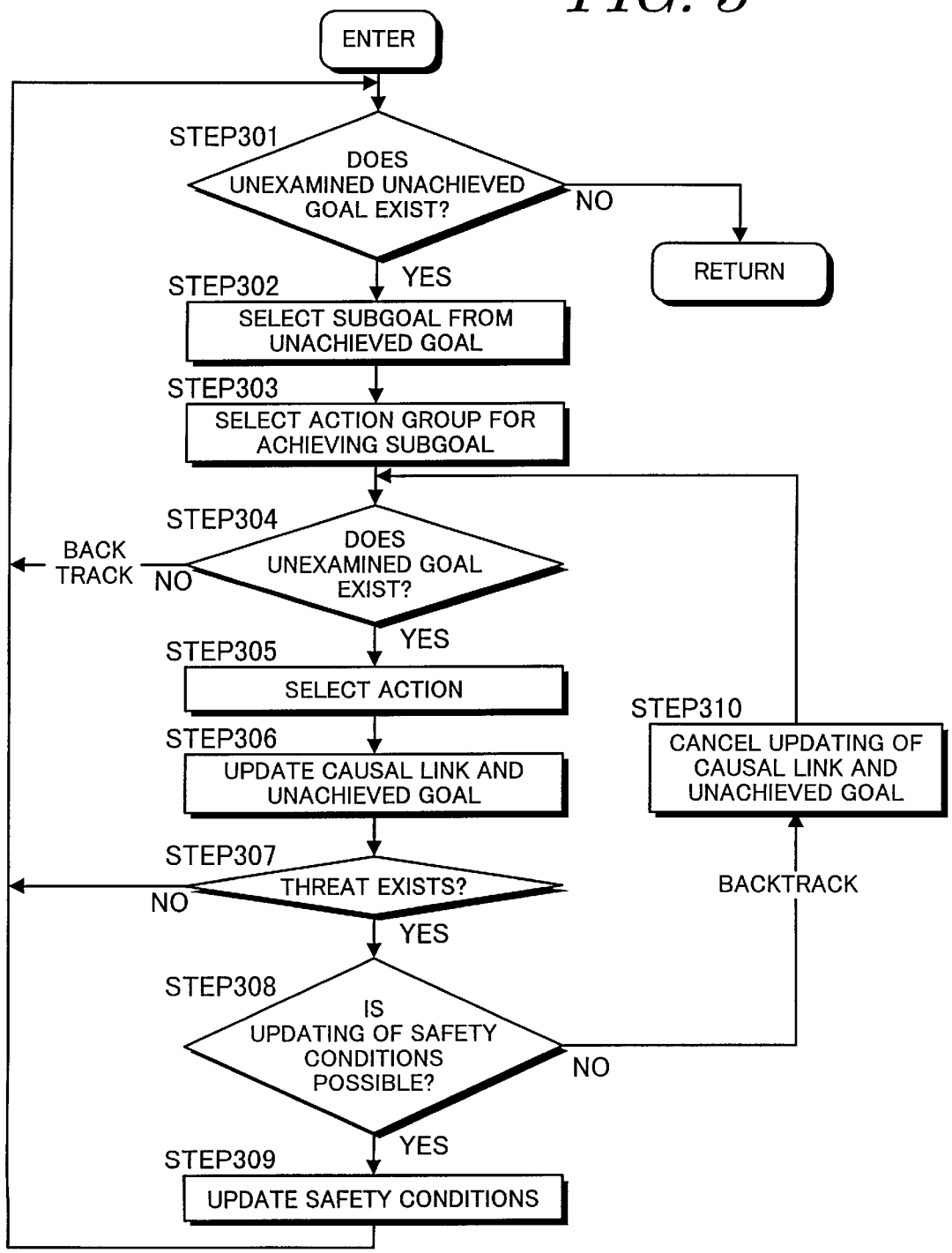
FIG. 3 is a flowchart which shows the sequence of plan generation in the first, embodiment of the present invention.

The planning procedure in this embodiment is shown by the flowchart in FIG. 3. First a check is made for unachieved goals (step 301). An unachieved goal is a condition among the pre-conditions of each action that makes up an action set that is not recorded as a fact that has occurred in a causal link. In this embodiment, because the first causal link is empty, the two pre-conditions of the action "*end*" are unachieved goals.

In the case in which there exists no unachieved goal, the plan generation is terminated. If an unachieved goal exists, however, one unachieved goal is selected as a subgoal (step 302). In this embodiment, for example, "file-exists(File) at Node" is selected as a subgoal. Next, at step 303 actions are grouped together so as to achieve the above-noted subgoal as a post-condition with respect to the selected subgoal.

If the conditions achieve the subgoal, by substituting appropriate items into the variables of this condition it is possible to achieve coincidence with this subgoal. More specifically, an action that achieves a subgoal means an action that has a post-condition which coincides with the selected subgoal's pre-condition in terms of elements other than variables. In this embodiment, for example, only the action "go(node1)" is listed.

Then a test is made whether even one action could be listed (step 304) and, if it could not, subgoal selection is redone in what is known as backtracking processing (step 302).

Then, one action is selected from the listed actions (step 305), being added to a causal link the selected action that sacrifices the pre-conditions of other actions in accordance with the subgoal conditions. The selected action, which sacrifices the pre-condition of other action and can be added a safety condition that prevents the loss of this pre-condition before execution of the other action, is added to the causal link in accordance with the subgoal conditions.

More specifically, the above-noted processing is performed as follows. First, the causal link and unachieved goal are updated, based on the action information of the action (step 306). The updating of the causal link is performed by making the above-described substitution with respect to the action information elements (action code, pre-condition and post-condition), and by adding to the causal link the action code, the subgoal, and the action code of an action that has the subgoal as a pre-condition. Simultaneously with this, the pre-condition of this action information is newly added to the unachieved goal. In this embodiment, for example, the action "go(node1)" is selected, resulting in the following updating of the causal link, and the unachieved goal.

Causal link: [(go(node1),file-exists(File at node1,*end*)]

Unachieved goal: [include-keyword(File,patent)]

[Threat Detection]

Next, at step 307, an examination is made to determine whether or not the selected action would cause loss of another causal link condition, that is, loss of a state that is the pre-condition for another action (step 307). If it would, this condition is known as a "threat". In this embodiment, the selected go action does not cause a loss of that condition. That is, the go action does not generally cause a loss of a condition. That go action does not cause that, loss because there is no action that becomes impossible because of a node migration.

If a threat exists, a test is made to see if it is possible to update a safety condition in order to avoid that threat (step 308). Updating of the safety condition is possible in the following case.

For example, this is the case in which if, with respect to a group that was added to a causal link (action 1, condition, action 2), it is possible to add the pair (action 1, action 2) to the safety condition without causing conflict, and if a threat exists, that is, if with respect to another causal link (action 3, condition 2, action 4) action 1 causes the loss of condition 2, it is possible to add the pair (action 3, action 1) or the pair (action 4, action 1) to the safety condition without causing a conflict.

In the case in which it is not possible to update the safety condition, the updated states of the causal link and unachieved goal are returned to those before the updating (step 310), by so-called backtracking, processing being done once again from the selection of an action. In the case in which safety condition updating is possible, the above-described updating of the safety condition (addition of a pair) is done at step 309.

In this embodiment, because the pair "(go(node1), *end*)" can be added to the safety condition without a conflict, as a result of the updating, the safety condition is "[(go(node1),*end*),(*start*,*end*)]". Thereafter, processing is again repeated from step 301. In this manner, by repeating processing refering to the required local information, it is possible to try additions to the causal links for all actions which correspond to each of the unachieved goals.

That is, an action can be executed when its pre-condition is satisfied, the result of the execution being the post-condition. An action which causes the occurrence of a desired target state as its post-condition is connected by a causal link to the target state, and further connection is made to an action which causes the pre-condition of the connected action as its post-condition. In this manner, by repeating the connection in the reverse sequence from that of the execution sequence, an operation series that achieves the desired state is obtained. Thus, according to the present invention, because a plan is generated in terms of a small-scale processing as a unit, the efficiency of processing is improved.

[Agent Information Updating]

In this embodiment, after repetition of the completion of the processing, the information that is stored in the agent information storage means 3 is as follows.

Action set: [grep(File,patent),go(node1)]
Safety condition: [(grep(File,patent),*end*),
(go(node1),*end*),(*start*,*end*)]
Causal link: [(grep(File,patent),
include(File,patent),*end*),
(go(node1),file-exists(File) at node1,*end*)]
Unachieved goal: [file-exists(File)]

Figure 4:
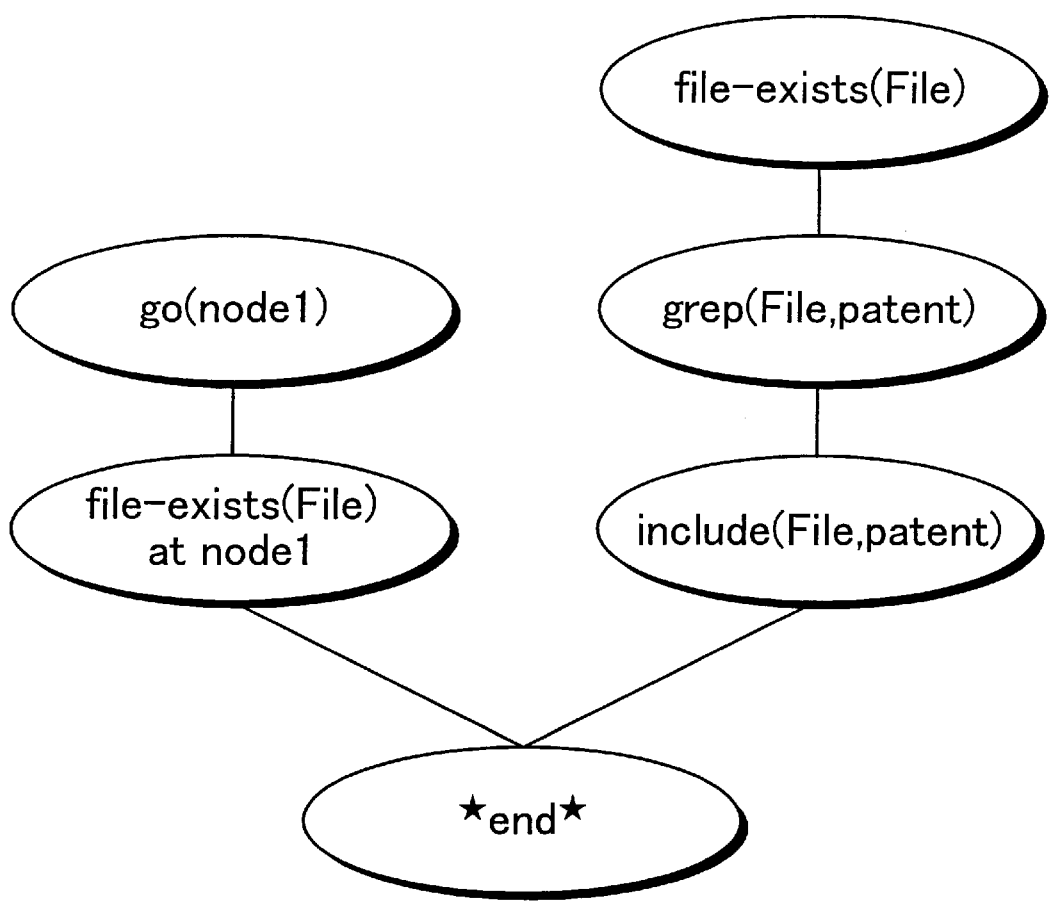
FIG. 4 is a tree diagram which shows the contents of the plan generated in the first embodiment of the present invention.

FIG. 4 shows the contents of this action information as a tree diagram (plan tree).

[Plan Evaluation]

When a plan is generated as described above (step 203 in FIG. 2), a judgment is made with regard to the occurrence of the plan (step 204; claim 10). In doing this, if an unachieved goal exists and the action set is empty, the plan generation is judged to have failed. In the case in which no unachieved goal exists, the plan generation succeeds, and the request code is judged to have succeeded, without actually executing the plan. If an unachieved goal exists and the action set is not empty, the judgment is made that the plan generation succeeded and that execution of the plan is required.

In the case in which the plan generation succeeds and request code has been achieved, and the case in which the plan generation itself fails, the agent informs the users of this, via the input/output means 3 (step 205), and the entire procedure is terminated. If the agent is migrated from the original local machine L, and the request code is achieved or the plan generation fails at the remote machine R, the agent returns to the local machine L, and outputs information to that effect. In this manner, in this embodiment the results of the plan generation are evaluated, processing being selected based on that evaluation, thereby improving the efficiency of processing.

[Plan Execution]

The plan execution means 6 searches for an executable action other than a go action (step 206; claim 9). Among the actions in an action set, an executable action is one for which the pre-condition is satisfied in the current, and also one which need not be executed after another action, in accordance with a safety condition.

If there is an executable action other than a go action (step 207), that action is executed (step 208), the procedure being executed again from step 206. If there is no executable action other than a go action, one go action is executed (step 209).

Thus, in this embodiment, because an executable action other than a go action is executed before executing a go action, the re-migration of an agent back to the original node is minimized, thereby improving the efficiency of processing.

In the example of this embodiment, at the point at which the plan execution begins, the action "grep(File,patent)" exits as an action other than a go action. At this point, however, because the pre-condition for this action has not yet been reached, the action cannot be executed, the result being that there is no executable action other than a go action. For this reason, the action "go(node1)" is executed.

When the go action is interpreted and executed, the plan execution means 6 informs the agent control section 7 of that effect, the agent control section 7 performing the following described agent migration processing.

[Agent Transfer]

Figure 5:
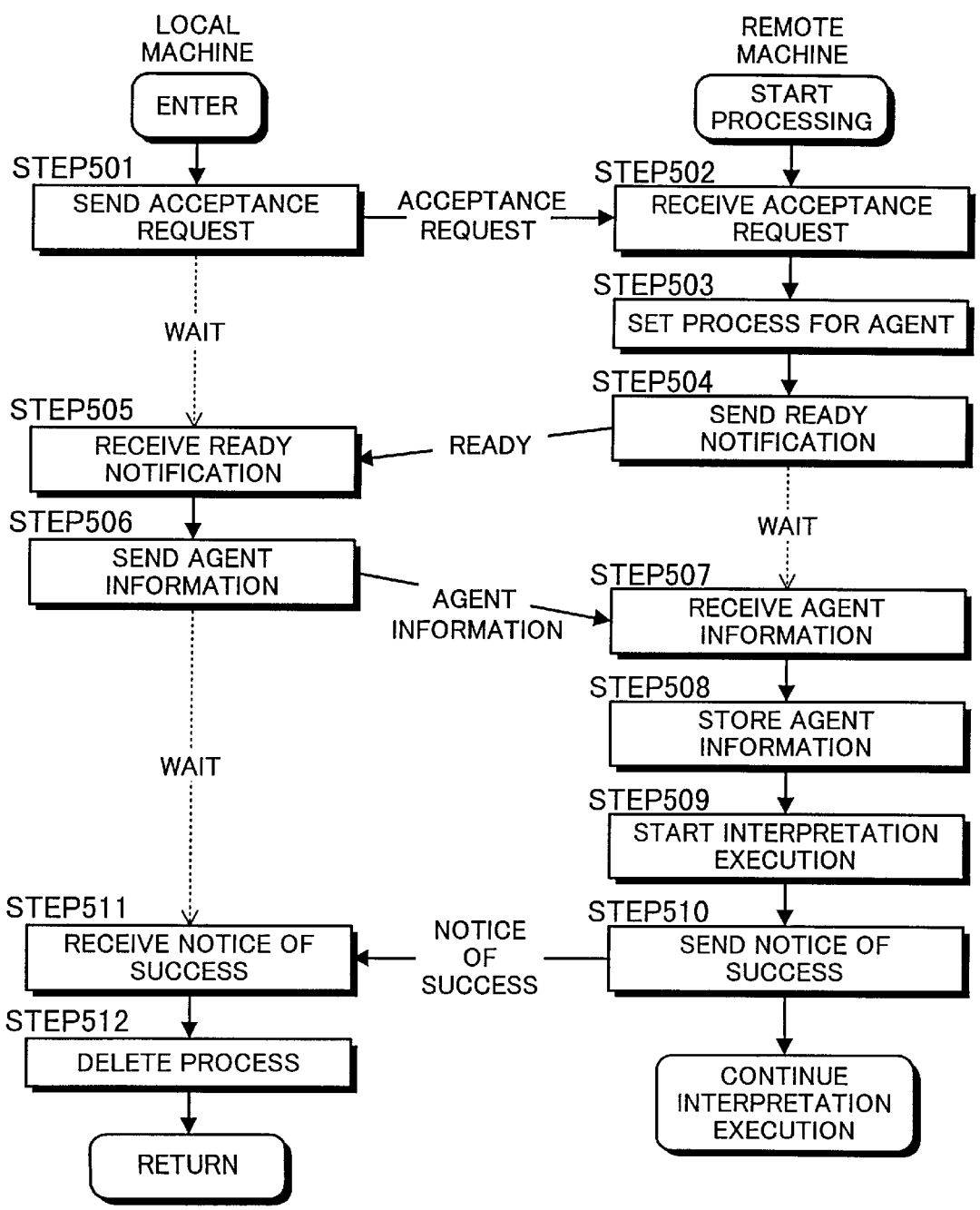
FIG. 5 is a flowchart which shows the procedure for agent migration in the first embodiment of the present invention.

When migrating an agent, the following procedure is executed between the agent control section 7L (hereinafter referred to as the local side) on the local machine side and the agent control section 7R (hereinafter referred to as the remote side) on the remote side, via the network N (claims 11 and 14). FIG. 5 is a flowchart which shows the procedure of migrating the agent.

First, an agent acceptance request is sent from the local side to the remote side (step 501). Upon receiving the request (step 502), the remote side sets the process for the agent to prepare for the acceptance of the agent (step 503), after which it notifies the local side that it is ready (step 504).

Upon receiving the above-noted notification of readiness (step 505), the local side reads the agent information within the agent information storage means 3, and sends it to the remote side (step 506). (The migrated agent information includes the internal state of the agent at the point in time that the go action was interpreted and executed.) When it receives the agent information (step 507), the remote side stores the received agent information into the agent information storage means 3 (step 508), informs the plan execution means 6 of that effect, causes the start of interpretation and execution (step 509), and sends a notification to the local side that the acceptance of the agent succeeded (step 510).

The local side, upon receiving notification of success (step 511), deletes the agent process (step 512), and releases now resources such as unnecessary memory, thereby ending the agent migration.

In the example of this embodiment, after the migration the following information is stored in the local machine node I of the remote machine.

file-exists(file1)

Additionally consider the case in which there actually exists a file named file1 at the machine node1, and that, this file includes the character string "patent". In this case, after being migrated to the machine node1, the agent executes plan generation anew, starting from initialization. As a result, the information stored in the agent information storage means 3 changes as follows.

Action set: [grep(file1,patent)]
Safety condition: [(grep(file1,patent),*end*)], (*start*,*end*)]
Causal link: [
(*start*,file-exists(file1),grep (file1,patent)), (grep(file1,patent),include(file1,patent),*end*)]
Unachieved goal: [ ]

Figure 6:
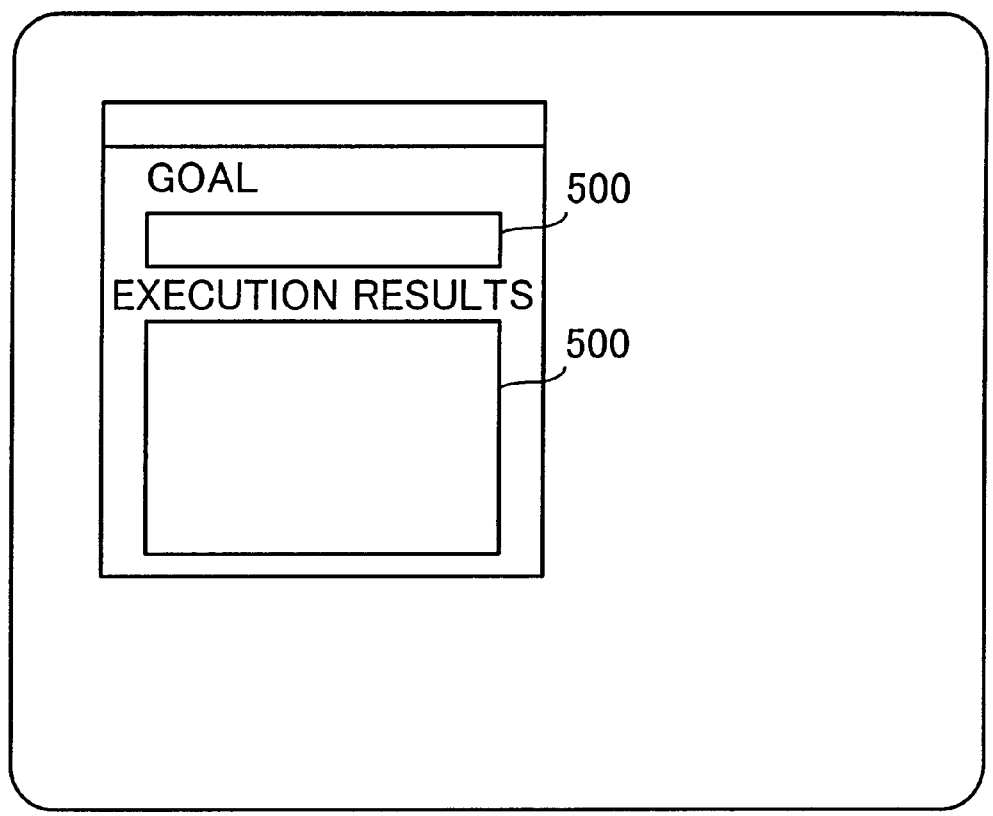
FIG. 6 is a drawing which shows a display example in the first embodiment of the present invention.

Because of these changes, the plan generation succeeds, and because the execution of the action grep(file1,patent) causes the plan to succeed, the agent is returned to the local machine, and the user is notified of that effect. FIG. 6 is an example of the output of the execution results. In this example, in the display window, the execution results 501 are displayed along witch the request code as the final goal 500.

Even in the case in which the file file1 is migrated to another machine, if information such as "maybe(file-exists (file2) at node2) or the like is instead stored in the local information storage means, re-planning can move the agent to the machine node2, enabling achievement of the goal, thereby enabling flexible accommodation of a changing environment.

As described above, according to this embodiment of the present invention, because agent behavior is established by a plan, there is no need for the user to code a series of agent operations, thereby improving the efficiency of data processing.

In particular, specific nodes which are access destinations of each constituent element are established based on local information when generating a plan. For this reason, even if there is a change in function or a file, that change is reflected in the behavior of the agent. Also, because there is no need to continue the migration of information between the local machine and the remote machine, it is possible to continue processing, even if there is an unexpected change in conditions, such as a cutoff of the connection between nodes of the network.

2. Second Embodiment

The second embodiment of the present invention is a data-processing apparatus that has almost the same configuration as the first embodiment (FIG. 1), the configuration and operation thereof being specified in more detail, particularly with regard to the replanning that can be done at a migration destination node in the event that this is required because of, for example, a failure of the execution of a plan.

(1) Configuration
(1-1) Overall Configuration

Figure 7:
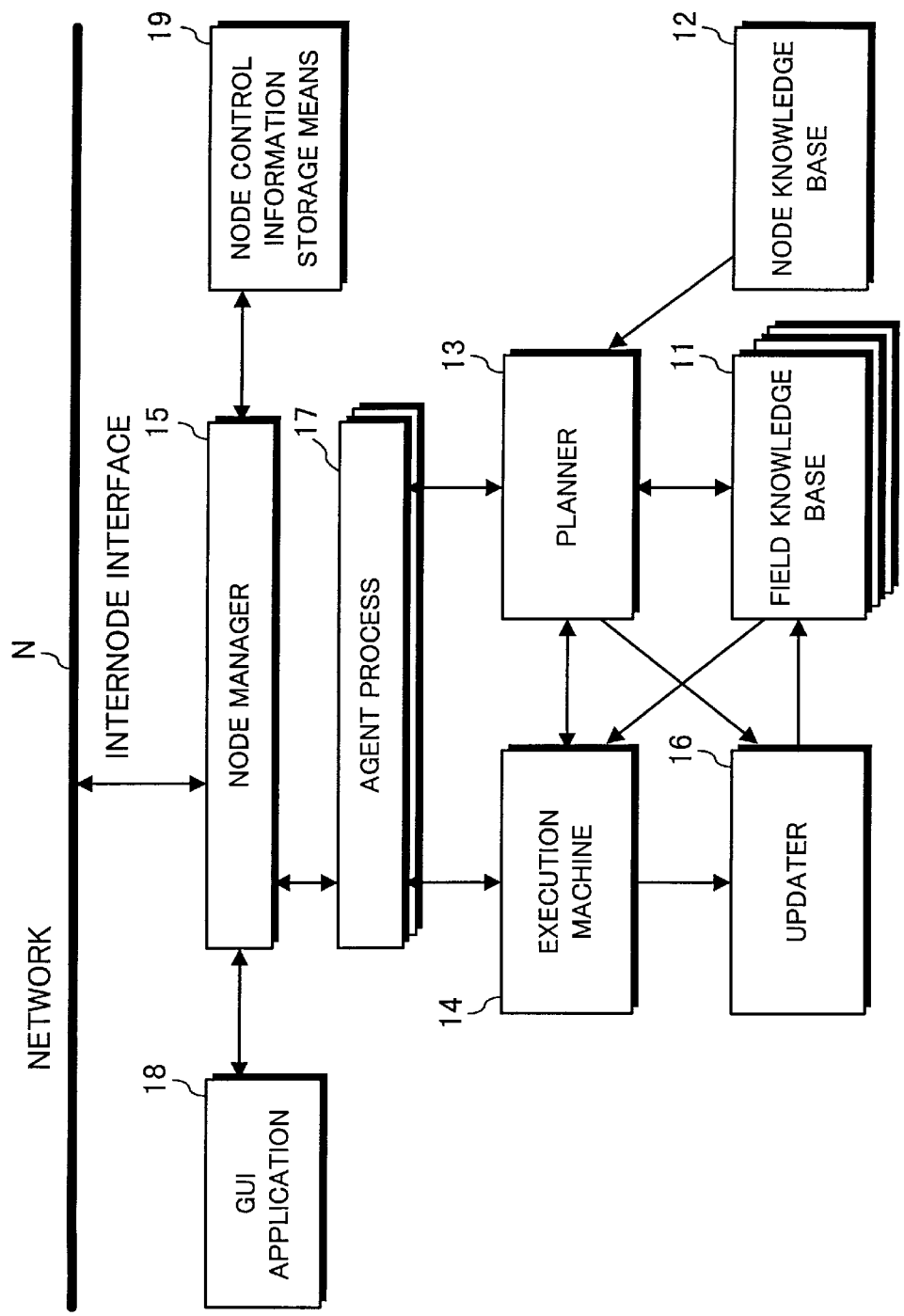
FIG. 7 is a functional block diagram which shows the node configuration of the second embodiment of the present invention.

The second embodiment, similar to the first embodiment, is a data-processing apparatus that processes data by means of the operation of an agent, which is an execution element in software, at a plurality of nodes that are connected by a network. FIG. 7 is a functional block diagram which shows the configuration of each node that is connected to the network N in the second embodiment. As shown in this drawing, each node has a field knowledge base 11, a node knowledge base 12, a planner 13, an execution machine 14, a node manager 15, and an udpater 16.

Specifically, each node has local information as the first information provided for use in accessing a constituent element located at the node. The field knowledge base 11 and node knowledge base 12, which are databases, store this first information, this corresponding to the local information storage means in the first embodiment. That is, the local information includes a part that is divided into a plurality of fields that correspond to types of agent, and a part that is characteristic to the node, these each being stored in the field knowledge base 11 and the node knowledge base 12, respectively. The term field is a unit within the node that has an individual knowledge base, the information stored in the field knowledge base 11 being a group of information that is used for only agents for a specific type of agent, that is, for an agent for a particular purpose or field.

In the second embodiment, each of the knowledge bases 11 and 12 has, in addition to the above-noted local information, has second information stored in it, which is with regard to the action that can be taken by the agent. The planner 13 is the part which, based on these first and second information, performs planning to generate a plan for execution by the agent 17 so as to achieve a given purpose, this corresponding to the plan generating means in the first embodiment.

The execution machine 14 is the part that executes the generated plan, this corresponding to the plan execution means in the first embodiment. The node manager 15 is the part provided for the purpose of generating/deleting an agent, and for migration of an agent between nodes, this corresponding to the agent control section of the first embodiment. The planner 3 and execution machine 14 of each node execute a plan and, if necessary, generate a plan even for an agent that has been migrated from another node (claims 16 and 24).

The information represented by the first information is information with regard to software elements at the node, more specifically this being such items as the state of the node, and files, databases, and software resident at the node. The second information with regard to actions is defined for each node individually.

When generating an agent plan, the planner 13 is configured so as to generate the plan based on field information corresponding to that agent. The node manager 15 is configured so that, when migrating between nodes, agent is migrated to a corresponding field at the migration destination node (claims 17 and 25). To cause migration to a prescribed field at an agent's migration destination, among migration commands included in the plan, it is possible to specify a field as a parameter of a command in a prescribed format.

The updater 16 is the part which, in the case in which the planning, plan execution, or migration in accordance with a plan fails, corrects information which caused the failure, this corresponding to the updating means in the first embodiment (claim 23).

Nodes use a GUI (graphical user interface) application 18 as a user interface. The user interface is software for the purpose of having the user directly monitor the state of the agent, this corresponding to the input/output means in the first embodiment. Because an agent actually exists in the software it is necessary for the user to access and control the status thereof, this requiring software that has a user interface, the GUI application 18 being used as this software. Information with regard to the management of resources such as memory at each individual node is stored in the node control information storage means 19.

Figure 8:
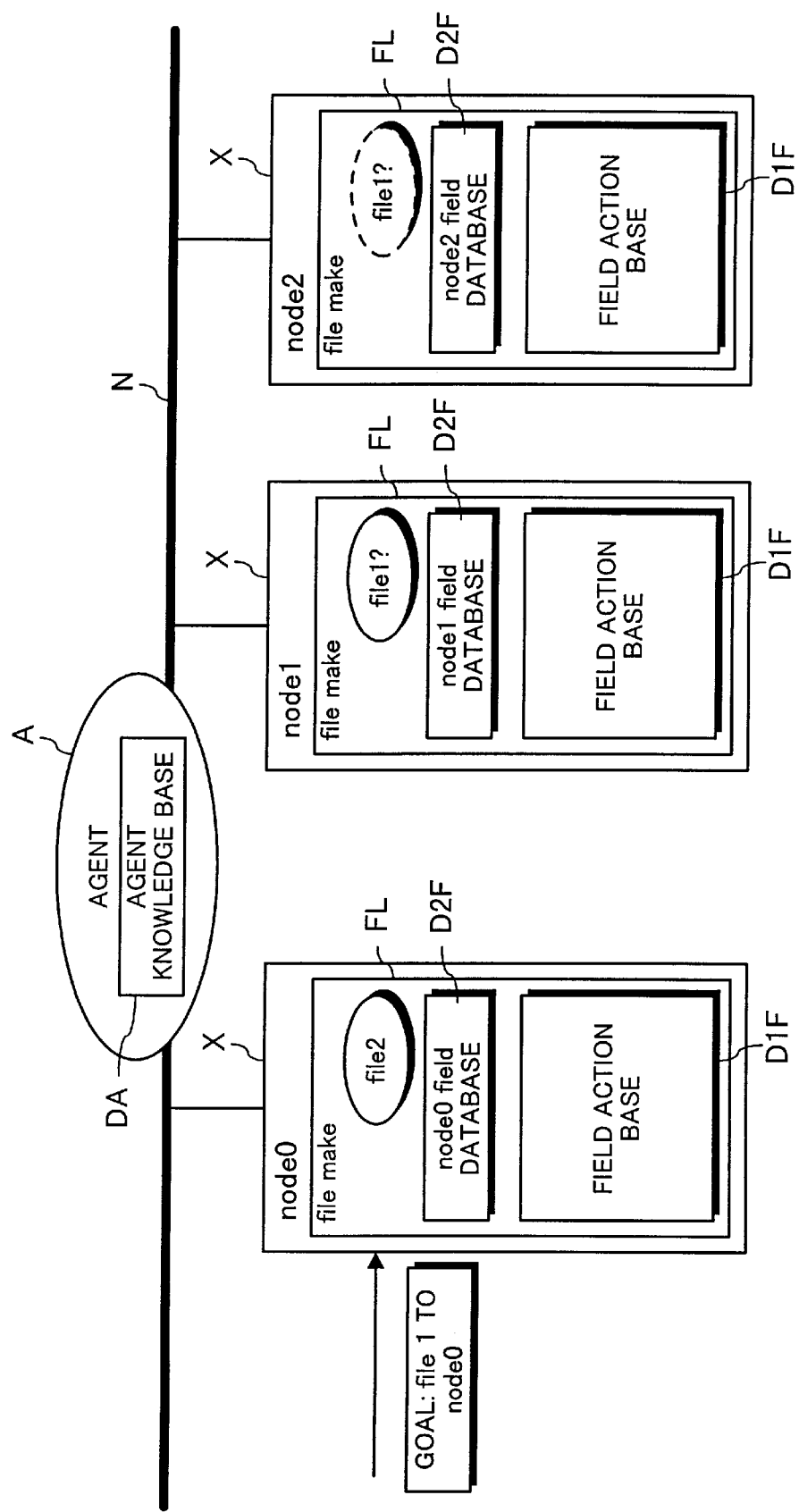
FIG. 8 is a block diagram which shows the node configuration included in the data-processing apparatus in the second embodiment of the present invention.

FIG. 8 shows a specific node configuration that is assumed in an example of the second embodiment. In this example, the assumed system is a data-processing apparatus in which three nodes X, these being node( ), node1, and node2, are connected to the network N. Each node X has a field F having the name make, the other fields being omitted. That is, in this example of the node configuration in the second embodiment, in software development by a number of persons, for example, a plurality of source files that are distributed on the network are assumed at some point in time to be collected at a specific node, the description to following being that of the processing at a particular selected part thereof.

As shown in FIG. 8, the agent A has information with regard to its characteristic status or actions, this information being stored in the knowledge base DA within the agent. The agent A carries this information with it even when migrating between nodes, this ported information being used in planning (claim 18).

(1-2) General Agent Configuration

An agent is a process that occurs at a node in accordance with a goal that is given by either a user or other software that uses this system. The term node refers to the unit of migration of an agent, this being an abstract concept. While the usual assumption is that a single node will exist with respect to a single host machine, it is also possible for a plurality of nodes to exist at a host machine. The user applies a name to a node that is unique throughout the network. In this case, it is possible assign a name to a node that using the same naming method as in existing computer networks, such as the case of the URL (universal resource locator). The above-noted process" is the unit of execution of software on a computer, this being managed by an operating system.

Figure 9:
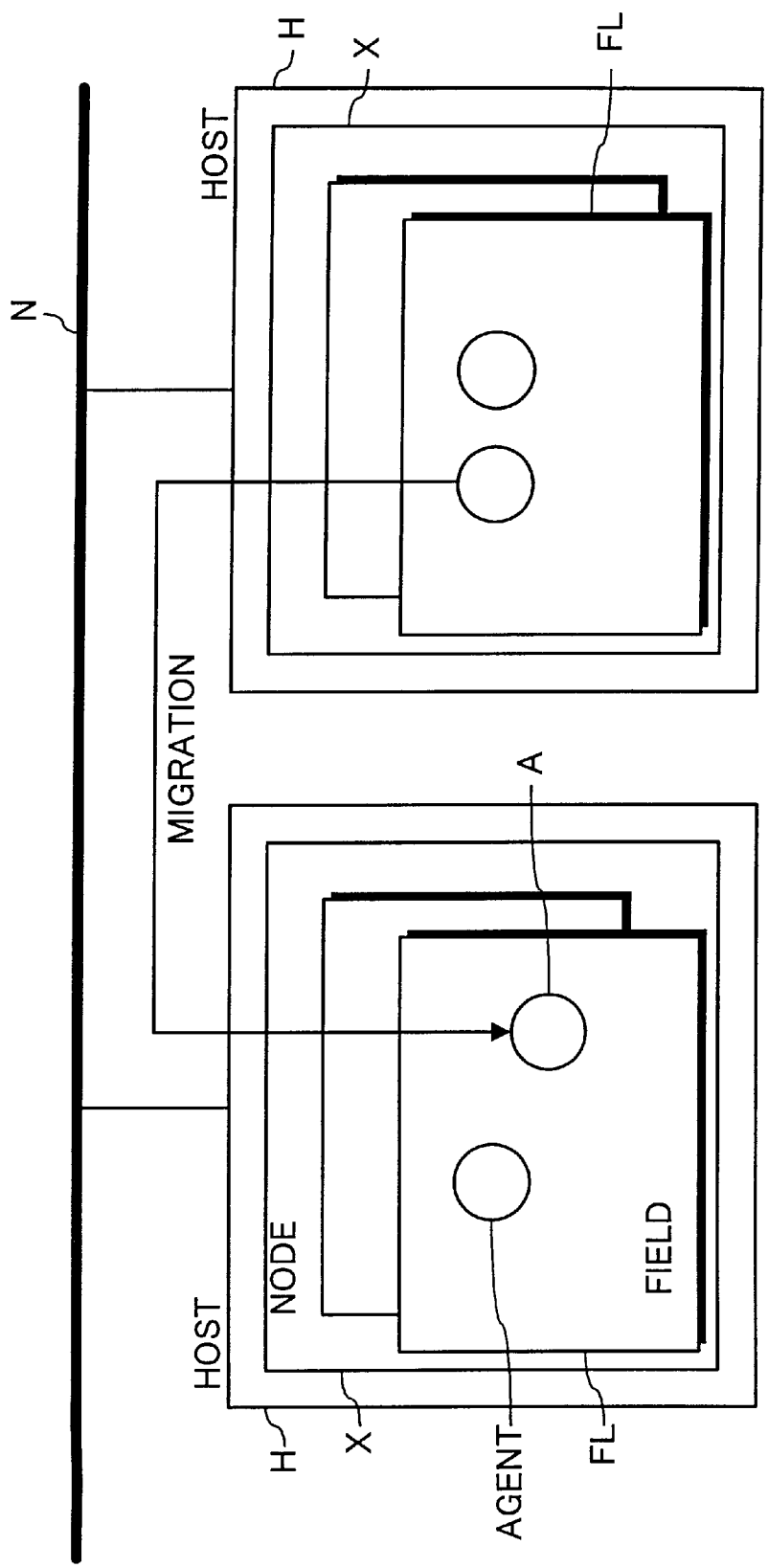
FIG. 9 is a drawing which illustrates the concept of separation of nodes into fields in the second embodiment of the present invention.

FIG. 9 is a drawing which shows the environment in the case of Plangent as a mobile agent, this conceptual drawing indicating the separation of nodes into fields. What is actually separated into fields are the first information and the second information that are stored in each node, this information serving as the locus for agent activities such as plan generation and plan execution by an agent. Therefore, by dividing the information at a node, there exists a plurality of fields that serve as the locus of agent activities.

The constituent environmental elements shown in the drawing include the node X which is permanently resident at the host H, the field F which is divided within the node X, and the agent A which migrates to the node X via the network.

The object of an agent such as this is to achieve a goal given in a prescribed format as an object for data processing. An example of such a goal is to search for a specific file which is assumed to exist at some other node, and to retrieve a copy thereof. For this reason, the agent generates and executes a plan to satisfy the given goal. If necessary to achieve the goal, the agent can be migrated to a different node. Processing related to agent plan generation and execution, and migration between nodes of agent is actually implemented by the planner 13, the node manager 15 and other elements.

A generated agent ultimately reaches a state in which is has achieved its goal or in which achievement of the goal is impossible, at which point it ceases to exist. The case in which the goal is achieved is known as normal termination of the agent, and that in which achievement of the goal is impossible is known as complete failure of the agent. When the agent ceases to exist, termination processing is performed.

Figure 10:
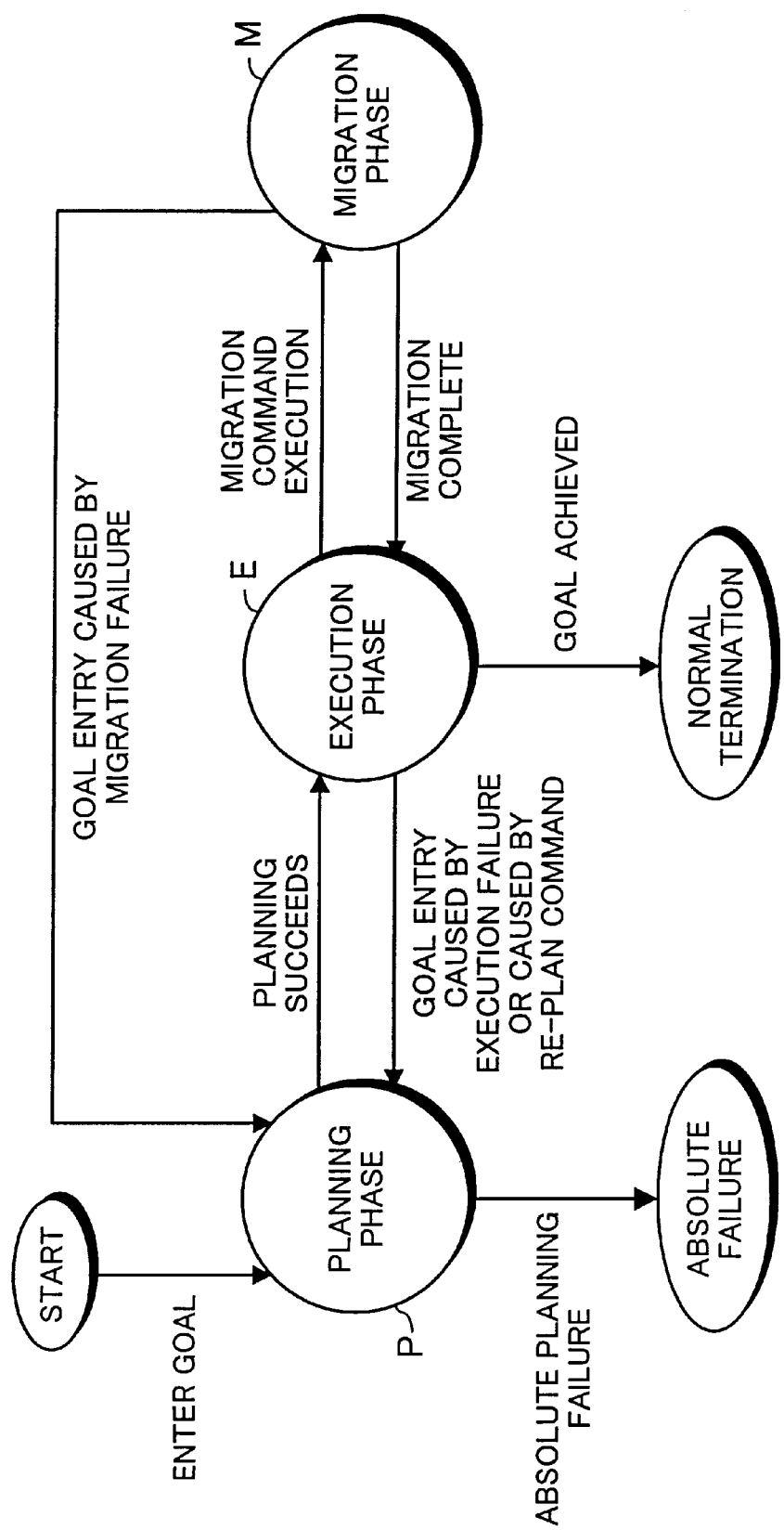
FIG. 10 is a drawing which shows a plurality of phases that make up operation of an agent in the second embodiment of the present invention.

FIG. 10 is a state transition diagram that illustrates the several phases in the activities of an agent. Specifically, once generated an agent performs data processing while repeating the three phases consisting of the planning phase P, the execution phase E, and the migration phase M.

(1-3) Logical Structure of an Agent

Figure 11:
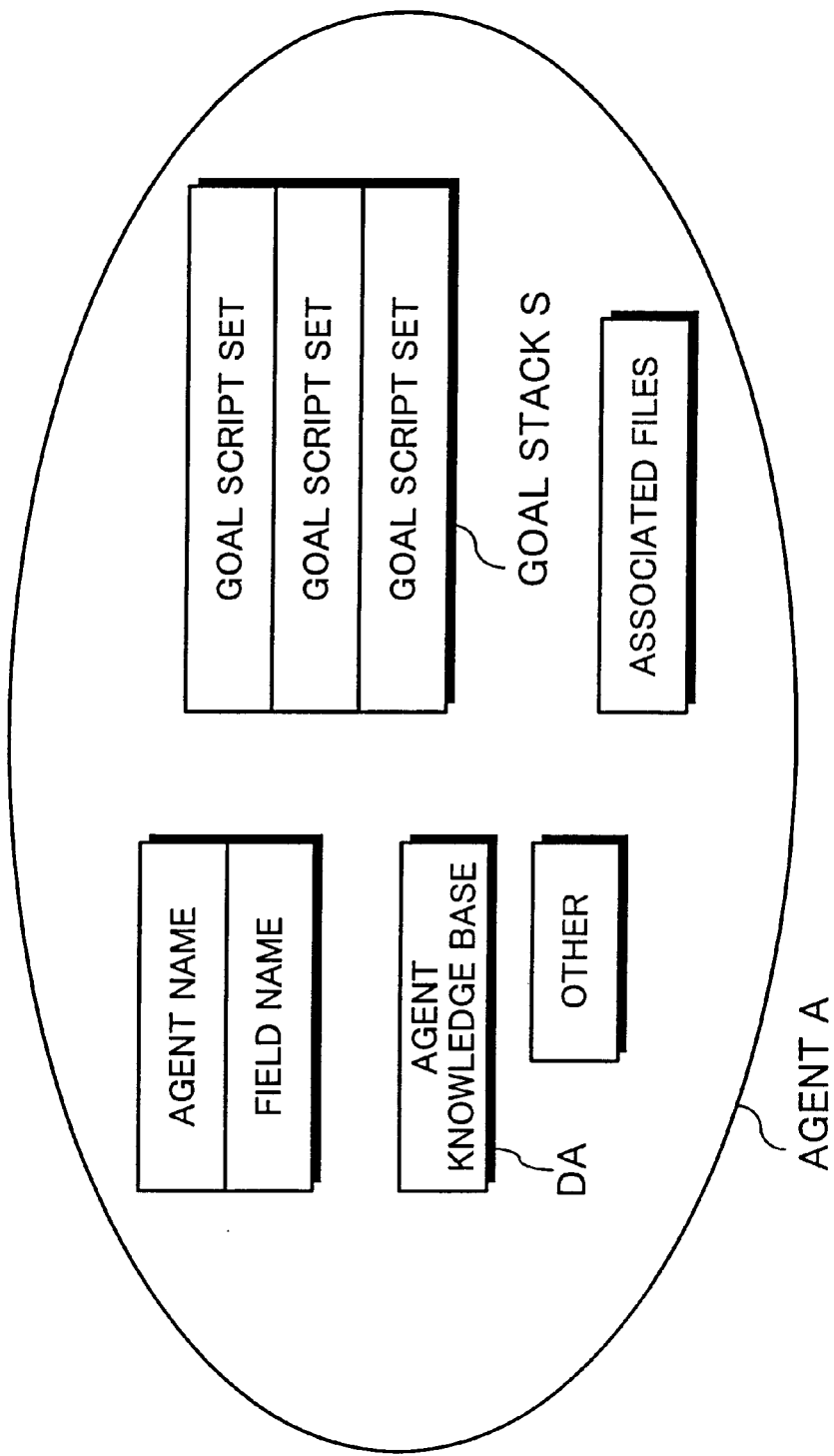
FIG. 11 is a drawing which shows the logical structure of an agent in the second embodiment of the present invention.

Turning to FIG. 11, which shows the logical structure of an agent in the second embodiment, we see that an agent has an agent name, a corresponding field name, and data such as a file or files it might have. The files an agent has are files that are part of the agent itself. By having an agent that had been migrated to a different node return to the original node carrying copies of its files, it is possible to perform effective data collection when the object is the collection of files. In addition to the above-noted items, an agent has the following constituent elements.

First, the goal stack S is a stack of goals during execution, provided for the purpose of performing hierarchical planning. The goal stack S is held as a set of goal scripts. This goal script set is a set of the final goal and subgoal, and of scripts for the purpose of achieving these goals, this including all the scripts that the agent has at any particular point in time.

The agent knowledge base DA is a knowledge base which is used by the agent together with the node knowledge base and the field knowledge base in planning. The element "other" shown in FIG. 11 can be, for example, execution information. Execution information includes such items as an agent name, field name, execution position for a script, and variable values used in a script. It is also possible that the "other" information can be, for example, information with regard to the specification of termination processing. The actual data structure that represents these types of information can differ depending upon the agent phase. For example, during the migration phase it can be communication content on the network, during the execution phase it can be the file structure on the storage medium, and during the planning phase it can be the data structure in the program stored in the computer's memory.

The reason the goals are expressed as a stack structure is that a goal given by a user usually has a hierarchical structure by virtue of the planning process. That is, a newly created subgoal must be stored hierarchically in the stack form within the agent. The goal script set data structure which makes up the goal stack is shown in FIG. 12.

In FIG. 12, the "goal" is a request that is given either by a user that makes use of the agent, or by other software. If we consider an arbitrary goal script set, it can be envisioned that a goal can be a subgoal. That is, a subgoal can be a goal that is the division of a condition that is required for satisfying a goal that is first given to an agent.

The subgoals that can be generated in the second embodiment are two types: a subgoal when a failure occurs, and a subgoal during planning. The failure subgoal is a subgoal that is generated for the purpose of attempting execution of a command in a different form in the case in which execution of a script by an agent fails with regard to a specific command. In this case, for example when the first candidate node for the address of a file fails to result in discovery of the file, it is the subgoal that discovers the file at the second candidate node.

A planning subgoal is a subgoal that is included within a script as a result of the usual planning. For example, if a goal is the discovery and retrieval of a file, the initial discovery of file or migration to another node for the purpose of discovering the file is a subgoal.

A subgoal can further have a subgoal, the overall structure of goals being hierarchical. The "goal stack" is held by a currently executing agent, and is a stack which controls the hierarchical goal structure. The agent holds the ultimate goal and subgoals given to it at the time of its creation in a hierarchical structure.

(1-4) Node Manager

The node manager 15 is the part that performs the above-described management of the agent. The node manager is a module that manages nodes, and in particular performs control of the creation of an agent and the migration of an agent between nodes. When performing this type of processing, the node manager performs communication with the node manager of other nodes when necessary. The interface used in this communication will be referred to as the internode interface. In the second embodiment, this is provided by means of the TCP interface that is used on the Internet protocol, this being called the node port. Each node manager functions as a server at each of the respective ports.

The node manager also performs communication with the agent that it itself creates. The interface used in this communication will be referred to as the node-to-agent interface. In the second embodiment, the node port of the node manager is used to implement the node-to-agent interface, the node manager acting as the server, and the agent process acting as the client.

Figure 13:
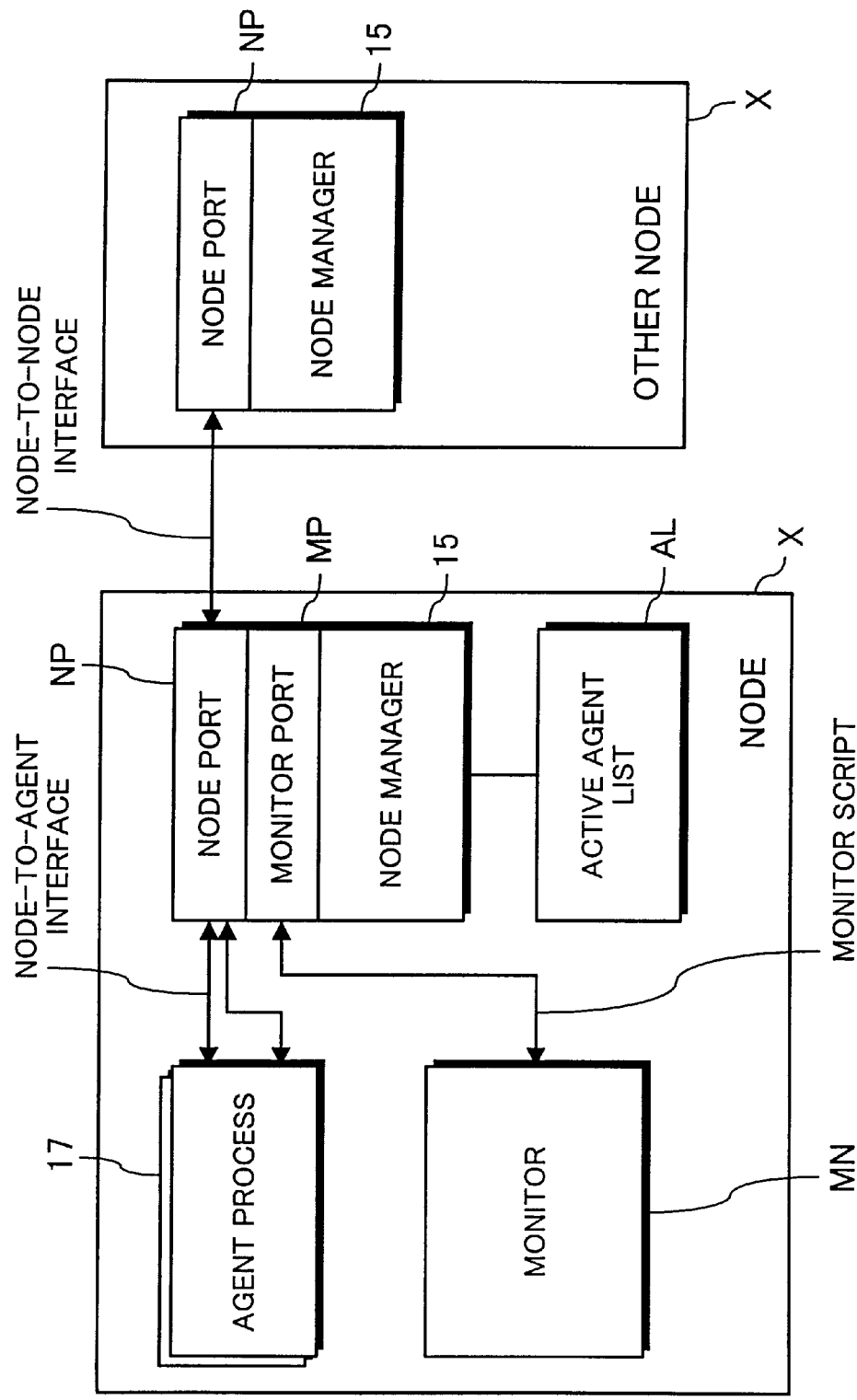
FIG. 13 is a functional block diagram which shows the functions that implement communication related to the node manager in the second embodiment of the present invention.

FIG. 13 is a drawing which shows an example of the configuration for the purpose of implementing node-to-agent communication and internode communication. At each node, a monitor MN is provided, which is a software module for outputting the state of the agent, the node manager 15 sending a monitor script to the monitor MN, this acting as a display instruction. The port name in the second embodiment is the monitor port MP. The node manager 15 side is the server port, and the monitor MN side is the client port. Unless otherwise stated, references to simply a node port will refer to a node port NP within the same node. The communication protocol at each of the communication ports is made up of the following statements, which are separated by a prescribed delimiter.

First, the following table shows the protocol of the internode interface in this embodiment.

TABLE 1

| Leading Character String | Meaning | Arguments |
| --- | --- | --- |
| AS | Start new agent. | Goal, field name, processing to be performed at termination |
| MF | Transfer of an agent from another node | Agent name, field name, goal stack, script, agent knowledge base, execution information |

The following table shows the protocol of the node-to-agent interface in this embodiment.

TABLE 2

| Leading Character String | Meaning | Arguments |
| --- | --- | --- |
| AE | Agent termination notification. | Agent name, status (succeeded, failure) |
| ST | Agent status notification | Agent name, status name |
| MT | Transfer of an agent to another node | Destination node name, agent name |

The node manager 15 outputs a monitor script from the monitor port for the purpose of monitoring the agent. With regard to the communication port, the session is carried out on the node manager 15, which is the server, from the monitor which is the client. The monitor receives the monitor script, and can perform user interface updating. The contents of the monitor script are basically in the following format, in response to access with respect to the node port.

TABLE 3

| Input to the Node Port | Meaning | Output to the Monitor Port |
| --- | --- | --- |
| AS + goal | Agent creation | <agent name> + ":enter" |
| AE + agent name, status (suceeded/ complete failure) | Agent termination notification | <agent name> + ":completely fail" (complete failure) <agent name> + ":completely" (succeeded) |
| MF + agent name, field name, goal stack script, agent knowledge base, execution information | Agent migration from another node | <agent name> + ":enter" |
| MT + destination node name, field name, goal stack script, agent knowledge base, execution information | Agent migration to another node | (Before migration) <agent name:>+ ":goto" + <destination node name > (After migration) <agent name:> + ":bye" |
| ST + agent name, status name | Agent status notification | <agent name:> + ":" + <status name> |

That is, the monitor receives a report with regard to the status of the agent from the node manager 15 in the form of a monitor script, and provides the agent status to the user. Naturally, if there is no server-client relationship set up with the monitor, the node manager 15 does not output the monitor script. The sequences which is shown in the flow-chart assumes that connections have been established with all monitors, and it goes without saying that, in the case in which a connection has not been established, it is not necessary to perform communication in accordance with the subsequent protocol.

(1-5) Knowledge Base

Figure 14:
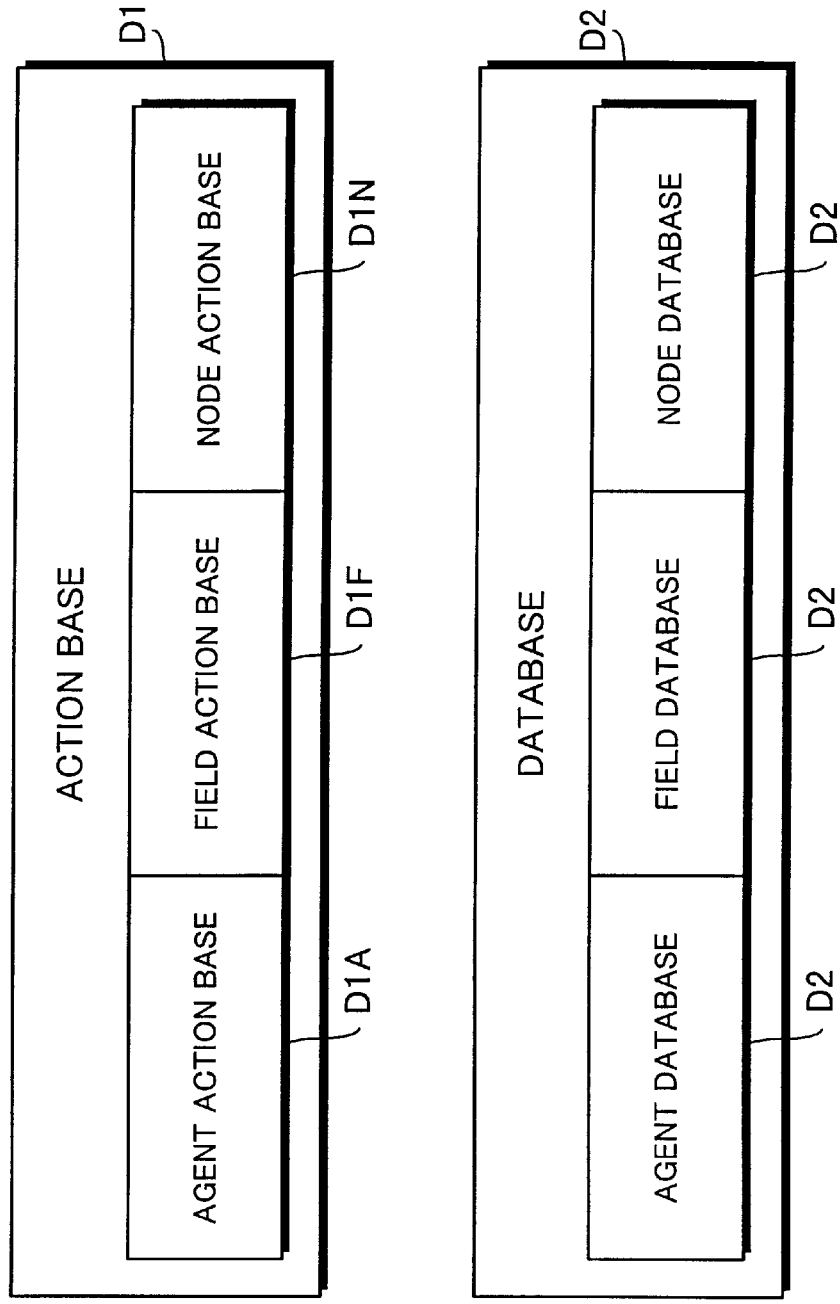
FIG. 14 is drawing which shows the structure of the knowledge base in the second embodiment of the present invention.

A knowledge base is a database which makes use of declaration-type coding. More specifically, in the second embodiment, this is a collection of facts coded in the Prolog language. FIG. 14 is a conceptual block diagram which is shown the configuration of a knowledge base. As shown in this drawing, there are two types of knowledge bases: the action base D1 and the database D2. The action base D1 is a set of actions that are absolutely required in planning. The database D2 is a knowledge base into which is stored the initial state of the system, this been absolutely required for planning. Either of these knowledge bases can be updated by means of an action.

The action base D1 and the database D2 each have an agent-specific part, a part that is divided into fields, and a node-specific part, these having the names agent action base D1A and agent database D2A, field action base D1F and field database D2F, and node action base D1N and node database D2N. A field is a part that corresponds to a specific different object of an agent, a single given field corresponding to agents which have a common object. By dividing a knowledge base into fields, in addition to implementing a plurality of differing knowledge bases within a single node, by using only the information required in planning for a given single agent, it is possible to perform planning with good efficiency.

In general when representing knowledge, the existence of conflicting code causes problems of semantics. The division of a knowledge base into fields makes it easier to achieve semantic uniformity of expression within each field, this having the effect of enabling smooth planning with agents and encouraging coding which facilitates the definition of actions.

That is, with regard to both an action bases and a knowledge base, there exist three types of knowledge bases: a knowledge base belonging to a node, a knowledge base belonging to a field, and a knowledge base belonging to an agent.

In the second embodiment, the description will be presented using Prolog language terminology. While there have been many descriptions of the Prolog language, including Leon Sterling & Ehud Shapiro "The Art of Prolog," the Prolog language coding used in the second embodiment uses only standard coding. In the. Prolog language, names which begin with upper-case letters are variables, these being replaceable by matching atoms or items that are a combination of atoms.

The following is a description of an example that illustrates how, using information with regard to another node as seen from a prescribed node, that is, by using maybe information, an agent performs planning, and the method of determining the behavior of the network in response to a network change. Maybe information is can be implemented in the Prolog language. That is, of the information stored in a knowledge base, information of the type maybe (maybe information) indicates expected but unverified facts. Maybe information is stored in a field database or in a node database.

The node manager in this system, which is the agent control section shown in FIG. 1, is configured so as to enable it to handle a variety of types of agents, corresponding to different fields. For example, an agent has specified for it, when the agent is created, a field which corresponds to the type of agent or the role the agent plays. In the second embodiment, by divided a knowledge base into individual fields, it is possible to reduce the amount of knowledge that is used in planning, this resulting in an improvement in the efficiency of planning.

(1-5-1) Action Base

An action base is a set of definitions of actions that an agent can take, the definitions being accompanied by pre-condition and post-conditions for the actions, an action set also including a go action which serves as a migration command that implements migration of an agent between nodes. When an execution machine executes a go action as a command, the agent is migrated between nodes of the network, an integrated plan being executed before and after this migration.

In an action base, information with regard to a given action includes not only the details of the action, but also the action definition name, a pre-condition, and a post-condition. Of this information, the action definition name is a representation of the action name and arguments (action parameters) expressed as items. The pre-condition is the condition that is necessary for execution of the action, this being expressed as an item list. The post-condition is a status change that results from execution of the action, this also being expressed as an item list.

Information with regard to an action can be represented, for example, in the format shown below. In the second embodiment, using the Prolog predicate action, this code indicates an action definition.

action(<action definition name>,<action>,<pre-condition>,<post-condition>).

In the above, <action> is made up of commands which are executable by an execution machine. That is, it is a string of a plurality of commands as shown below.

(1-5-2) Coding Format Example in an Action Base

An example of the coding format of an action base using Prolog in the second embodiment will now be presented. The action base and field action base are coded in a similar manner.

```
/************************************************
Action Set
action(action definition name,[commands which form the action],[pre condition],[post-condition])
************************************************/
action(goto ,
[
goto(Node, maybe(exist(file(F),Node)) )
],
[   home(HomeNode), maybe(exist(file(F),Node))   ],
[   add(seeking_for(file(F),HomeNode,Node))      ]
).
action(goto ,
[
update_agent_base( add( myself, returning ,HomeNode)),
goto_with_goal(HomeNode, return)
],
[   have(file(F))   ],
[   add( bringing(file(F),HomeNode) )   ]
).
```

In planning, actions which are required for achievement of a goal are extracted from the actions that are defined in the action base, and a script, which is a series of actions, that make up the plan is generated.

(1-5-3) Database

The database D2 in the second embodiment, similar to the case of the action base, is the overall name referring to three different databases, in this case the agent database D2A, the field database D2F, and the node database D2N, these being a set of facts with regard to the software resources on the network. For example, the agent database D2A is a database into which is chiefly stored information with regard to agent behavior, such as historical information, including for example information with regard to whether or not the operation of the agent has been completed. The field database D2F is a database which represents what processing can be performed at a particular node, with regard to software resources that are particular to that field. The node database D2N is a database into which is stored code with regard to what processing is possible at that node and what resources the node has. Naturally, if necessary a database can store other types of information.

The combination of the agent database D2A and the agent action base D1A is known collectively as the agent knowledge base DA, the combination of the field database D2F and the field action base D1F is known collectively as the field knowledge base DF, and the combination of the node database D2N and the node action base D1N is known collectively as the node knowledge base DN.

(1-6) Planner 13

The planner 13 performs planning based on goals given as the object of the data processing to be performed, this being the part that outputs a script as the plan to achieve the goal, and representing a part of the agent's function. Planning refers to the generation of an action program by the agent. A plan is a series of actions that a generated by planning, and a script is a data structure or file in software in which a plan is coded. The script is coded by using script commands. That is, a script command is an executable command that is coded within a script.

In the case of the second embodiment, the contents of the planning are generated as a series of actions so as to achieve the given goal, using the pre-condition and post-condition set (action definition) stored in the knowledge bases which are particular to the node and the field. The planner 13 if necessary also performs replanning. Replanning is regeneration of an action program for the agent in the case, for example, in which the execution fails.

Planning can be implemented by using the goal given by the user, and the contents of an action base in which is stored an action set, and a database in which is stored information which represents the current status. The planner 13 is a module which inputs this information, and which performs planning by outputting a script.

In performing planning, the planner 13 reads in from the agent knowledge base, the field knowledge base, and the node knowledge base with regard to both the action base and the databases, merging these various sets of information to perform planning.

The processing performed as planning can be a known type of processing (Reference: S. C Shapiro, "Encyclopedia of Artificial Intelligence" planning page). An example of an implementation of a planner using the Prolog language is shown below as a Prolog program.

```
/***** Planning Definition ************/
plan( Goal, Node ) :- plan( Goal, Node, Node, _ ), halt.
plan( Goal, Node ) :- halt.
plan( Goal, Home, Node, PL ) :-
            plan1( Goal, Home, Node, PL ),
            reverse(PL, PL2),
            tell('script'),
            writePlanList( PL2 ), nl,
            told,
            write('script ="'), write('script'), write(" "),nl.
plan( Goal, Home, Node, PL ) :-
            tell('script'),
            writePlanList( [['%no']] ), nl,
            told,
            write('script ="'), write('script'), write(" "),nl.
plan1( Goal, Home, Node, PL ) :- info(_,_), !,
       infoList( Home, Info0 ),
       goal( Goal, Home, Node, Info0, Info, [ ], PL, [Goal], _ ).
plan1( _,_,_,[['%no']] ) :- !, write('There are no info.'), nl.
goal( G, _, _, Info, Info, PL, PL, AGL, AGL ) :- member( G, Info ).
goal( G, H, N1, Info0, [G|Info], PL0, [P1|PL], AGL0, AGL ) :-
            action( _, P1, Pre, [add(G)]),
            goals( Pre, H, N2, Info0, Info, PL0, PL, AGL0, AGL ),
goals( [ ],     _, _, Info, Info, PL, PL, AGL, AGL ).
goals( [G|GL], H, N, Info0, Info, PL0, PL, AGL0, AGL ) :-
            goal( G, H, N, Info0, Info1, PL0, PL1, AGL0, AGL1 ),!,
            goals( GL, H, N, Info1, Info, PL1, PL, AGL1, AGL ).
infoList( Node, L ) :- setof( Info, info(Node,Info ), L ).
/******* Output a script file of the commands of actions included in the
generated plan *****************/
writePlanList( [ ] ) :- !.
writePlanList( [A|L] ) :- !, writePlan( A ), writePlanList( L ).
writePlan( [ ] ) :- !.
writePlan( [A|L] ) :- !, emitCommand( A ), writePlan( L ).
emitFileList( [ ]).
emitFileList([F|FL]) :- emitFileName(F), write(' '), emitFileList(FL).
emitFileName( file(FileName, Ext) ) :- !,
       write(FileName), write ('.'), write(Ext).
emitFileName( DB ) :- !, write(DB).
emitCommand( comment(G) ):- emitCmd( comment(G) ).
emitCommand( X ):- emitCmd( X ),nl.
emitCmd( update_field_base(A) ) :- !,
       write('%update_field_base '), write(" "),write(A),write(" ").
emitCmd( update_agent_base(A) ) :- !,
       write('%update_agent_base '), write(" "),write(A),write(" ").
emitCmd( check(F,Node,R) ) :- !,
       write('%check '), emitFileName(F),
       write(' '),write(Node),
       write(' "'),write(R),    write(" ").
emitCmd( check_with _goal(F,SG) ) :- !,
       write('%check '), emitFileName(F),
       write(' "'),write(SG),   write(" ").
emitCmd( check_and_redo(F,SG,[G]) ) :- !,
       write('%check_and_redo '), emitFileName(F),
       write(' "'),write(SG), write('" "'),write(G), write(" ").
emitCmd( goto_with_ack(N) ) :- !, write('%goto_with_ack '), write(N).
emitCmd( goto(N) ) :- !, write('%goto '), write(N).
emitCmd( goto(N, at(P,NN)) ) :- !,
       write('%goto '), write(N),
       write(' "remove('), write(NN), write(', '),write(P), write(')'").
emitCmd( goto(N, Reason) ) :- !,
       write('%goto '), write(N),
       write(' "'),write(Reason),  write(" ").
emitCmd( goto_with_goal(N, G) ) :- !,
       write('%goto_with_goal '), write(N),
       write(' "'),write(G),    write(" ").
emitCmd( wait_and_goto(N) ) :- !, write('%wait_and_goto '), write(N).
emitCmd( put(F)    ) :- !, write('%put '), emitFileName(F).
emitCdm( get(F)    ) :- !, write('%get '), emitFileName(F).
emitCmd( rename_file(F,G) ) :- !,
       write('rename '), emitFileName(F), write(' '), emitFileName(G).
emitCmd( plan_and_exe(G,C) ) :- !, write('%plan_and_exe "'),
       write(G), write('" "'),
       write(C),write(" ").
emitCmd( fail(M)    ) :- !, write('%fail "'), write(M), write(" ").
emitCmd( comment(G) ) :- !,
emitCmd( display ) :- !,write('%display').
emitCmd( X ) :- !, write( X ).
/**** Prolog Predicate Definitions *****/
setof(X,G,L) :- setUp, G, setPush(X), fail.
setof(X,G,L) :- setPop(L).
reconsult(F) :- [F].
append( [ ], X, X ).
append( [A|X], Y, [A|Z] ) :- append ( X, Y, Z ).
reverse ( [ ], [ ] ).
reverse( [A|X],Z ) :- reverse(X,Y), append(Y,[A],Z).
member( X, [X|_] ).
member( X, [_|L] ) :- member( X, L ).
```

(1-7) Execution Machine 14

The execution machine 14 is the part that interprets and executes the script of a plan that is generated by the above-noted planner 13. Specifically, the concept is that, the agent has an execution machine 14 that, with respect to a script that is generated by the agent using the planner 13, interprets and executes the series of actions coded in the script as a series of commands, the agent operating so as to control both the planner 13 and the execution machine 14.

The execution method and operation technology of the execution machine 14 is generally that of an interpreter-type language. The execution machine 14 in the second embodiment is intrinsically equivalent to csh in a UNIX operating system, with script being input and executed line by line, this resulting in the return of an execution status. Script commands that are interpreted and executed by the execution machine 14 can be the type given as the following examples.

(1-7-1) Command Series with an Action in Common With csh

The following commands exist which have actions that are in common with csh. While these commands can be executed on a UNIX system by calling csh, it is obvious that they can be implemented in languages as well.

TABLE 4

| Command | Meaning | Coding Example |
|---------|---------|----------------|
| rm | Remove (delete) a file. | rm. theAgent |
| cp | Filename copy. | |
| cc | c compiler startup or linker startup. | cc *c srcl.c<br>cc *o exe.e srcl.o src2.o |

(1-7-2) Control Structure and Variable Processing

Although the execution of a script in the second embodiment is generally done in sequence from the top of the script down, with one command executed on each line, the following control statements can be used to perform conditional branching and repetition. For details with regard to the semantics and defining equations of operations, refer to the C language specifications subset.

TABLE 5

| Command | Format | Coding Example |
|---|---|---|
| Substitution | $(variable)=expression | $i=l+1 |
| %if | %if(expression)<br><arbitrary command series><br>%elseif<br><br>%endif<br>File name copy | %if(1==0)<br>  rm tmpFile;<br><br>%elseif<br>  cp tmpFile newFile<br>%endif |
| cc | c compiler startup<br>linker startup. | cc *c src1.c<br>cc *o exe.e src1.o src2.o |

(1-7-3) Agent Commands

The execution machine can use the following commands within a script in order to achieve the processing required as a mobile agent. In the second embodiment, by expanding the execution machine it is possible to expand the types of commands.

TABLE 6

| Command | Format | Meaning |
|---|---|---|
| goto | %goto<node name> | Transfer to another node. If the migration fails, replanning is performed with the current goal. |
| goto | %goto<node name> "information from the database that is used as the basis for migration" | Transfer to another node. If the migration fails, the argument information is deleted from the origin of the migration (from both the agent, field, and node databases). |
| goto | %goto_with_subgoal <node name> "subgoal" | Transfer to another node. If the migration fails, planning is performed by the argument subgoal as a substitute method. |
| wait_and _goto | %wait_and_goto <node name> | After a given amount of time has elapsed, migration to another node. If the fails, retry the migration up until a prescribed number of retries. |
| get | %get<file name> | Acquisition (copy) of a file by an agent. |
| put | %put<file name> | Copy of a file to a node by an agent. |
| Update _node _base | %update_node_base "update predicate" | Update of a node database. |
| Update _field _base | %update_field_base "update predicate" | Update of a field database. |
| Update _agent _base | %update_agent_base "update predicate" | Update of a agent database. |
| check | %check<file name> <source of basis> "information that was the basis" | Check for the existence of a file. If the file does not exist, an agent is created that deletes the information that was the basis from the source of the information. |
| Check _with _sub goal | %check_with_subgoal <file name> "subgoal" | Check for the existence of a file. If the file does not exist, the script execution fails, and planning is performed in accordance with the subgoal. |
| plan_and _exe | %plan_and_exe "subgoal" | Push the subgoal onto the goal stack and perform planning. |

The meaning of "Push the subgoal onto the goal stack" in the last item in Table 6 is that, as shown in FIG. 11, in addition to the subgoals, present script, script execution position, and variable values used in the script are pushed onto a stack as the goal script set. Of these items, the gotowith_subgoal command, the check_with_subgoal command, and plan_and_exe are commands that have a subgoal. A command which has a subgoal is a migration command that causes an agent to migrate between nodes, wherein a subgoal is specified for the case in which the migration fails.

The goto command having the "information from the database that is used as the basis for migration" in the second row from the top of Table 6 is a command with a basis. In general, when an agent given a specific goal performs planning, an action, that is a command, that is used in planning must have a pre-condition that is satisfied in the knowledge bases. This pre-condition can also be maybe information. However, in the case of maybe information, because there is no guarantee that the information is true in the actual network, after the agent completes the planning, at the point at which the generated script is executed, there are cases in which the coded contents of the maybe information, which is a pre-requisite, are different. A command with a basis is a command which includes the action of corrected an error in maybe information that is detected at the time of execution. That is, a goto command with "information from the database that is used as the basis for migration" is a command having a function that if the migration was not possible, the judgment is made that the pre-condition at the time of planning was different and, as shown in Table 6, this command has the action of deleting the information from the database given as an argument.

In the same manner, the check command shown in Table 6 is also a command with a basis. At a node at which an agent exists that executes a check command, if the file indicated by the first argument thereof does not exist, the information indicated by the third argument is taken to be in error, and is deleted from the database indicated by the second argument.

The action of these commands with a basis is effective when replanning is performed by an agent executing such a command and, when, as shown in a subsequent operational example, replanning is performed by a following different agent.

(1-7-4) Database Updating Predicates

The update command shown in Table 6 serves as an interface to the updater 16 (FIG. 7), performing updating of the contents of the agent knowledge base, the field knowledge base, and the node knowledge base in the second embodiment. There are the following two types of updating predicates.

TABLE 7

| Command | Format | Meaning |
|---|---|---|
| add | add(<knowledge base to be updated>, <fact>) | Add the fact to the specified knowledge base. |
| remove | remove(<knowledge base to be updated>,<fact>) | Delete the fact from the specified knowledge base. |

The updating predicates are instructions for the purpose of updating the contents of a database, based on the knowledge which can get by behaving the agent. Because of the existence of an updating predicate, the updating in a network that is changing is accommodated by planning by the agent itself, enabling replanning of the agent itself or planning with respect to similar goals of a different, subsequent agent, based on new information.

(1-7-5) Simple Script Example

A simple script example, using the above-described script commands, will now be presented. This script is one which moves and copies to the node node0 the file file1 that exists in a prescribed directory at the node node1. If the planner outputted this script, the agent would execute the script starting from the top and proceeding downward.

%goto node1
%get file(file1)
%goto node0
%put file(file1)

(2) Effect

The second embodiment configured as described above has the following effect. First, the activity of the agent in the second embodiment starts with the giving of a goal, and in the example presented below, before inputting the goal the following information is input to the various databases.

(2-1) Action Definition Example

The definition of the action base of a field using in this example is as follows. The example that follows is one that described an agent, that collects files that are distributed on the network and the fields for that purpose. The five actions for the purpose of achieving this type of goal are defined in the field shown below. A definition of a single action is a set consisting of, as noted above, an action definition name, an action, a pre-condition, and a post-condition.

The action definition name is a name of convenience that is applied to the action. The "action" in the action definition indicates the contents of the actual processing that the action performs, similar to the case of an execution machine 14 command. That is, the "action" in an action definition are the commands included in a script generated by the planner 13 when this action definition is used in planning, these being ultimately executed when the agent transitions to the execution phase.

The pre-condition is a condition that is required for the execution of the action. This condition is used by the planner 13 in performing processing in planning, and is not directly related to the agent's execution phase.

The post-condition is a condition that is added as a result of execution of an action. This condition is used by the planner 13 in performing processing in planning, and is not directly related to the agent's execution phase. That is, planning is a simulation that is done prior to the execution.

In the action base requires that, for each field, the action definition corresponding to the corresponding region of interest has been made beforehand. The action base is defined in terms of five action definitions, the first action through the fifth action, as indicated below. That is, the action base described below is distributed at node0, node1, and node2 beforehand. The distribution and correction of the action base with respect to each node can also be performed by using the agent in the second embodiment.

(2-1-1) Action: goto1

In the first action definition, a migration action which captures a file F at another node is defined. The contents of this first action definition are as follows.

```
action(goto1 ,
    [
    update_agent_base(home(HomeNode)),
    goto(Node, maybe(exist(file(F),Node)))
    ],
    [  maybe(exist(file(F),Node)), home(HomeNode) ],
```

-continued

```
    [  add(seeking_for(file(F),HomeNode,Node))    ]
).
```

The contents of the first action definition are two specific commands. The command update_agent_base performs an update of the agent database, and when this command is executed, the following fact is added to the agent database.

info(home(HomeNode)).

This operation means the storage of the agent's origin node in the agent. The second action in this action definition is a goto action with a basis. In the case in which this action is executed in planning, an agent that executes the generated script first executes the goto command with a basis as the above-noted execution machine command. A goto action with a basis is a migration command to which a pre-condition is appended as a parameter.

The first action definition has two pre-conditions. The first pre-condition is that the maybe predicate with regard to the existence of a file at another node exists in one of three databases (node, field, and agent databases). The second pre-condition is for the purpose of restricting the Prolog variable HomeNode, and to reflect this in the argument of the post-condition, this item being required in order to accurately reflect the migratestate of the agent in the post-condition.

The first action definition post-condition indicates to the planner 13 a migration that this agent is under the condition that it migrates from HomeNode to Node to search for the file F across the network. The add part of this action definition post-condition is completely different from the updating add (Table 7) predicate given as an argument to each of the update commands of the execution machine 14. That is, whereas in this code, the add is an indication by the action designer in the system to the planner 13 of an intermediate plan state required for planning, the add of the update command of the execution machine 14 is an indication that a script that instructs the execution machine 14 to add information to a database. The meaning of the add predicate in the post-condition is the same in the following actions as well.

(2-1-2) Action: goto2

The second action definition defines an action that copies a file F captured by the agent to the original node HomeNode. The contents of the second action definition are as follows.

```
action(goto2 ,
    [
    update_agent base( add( myself, returning ,HomeNode)),
    goto_with_goal(HomeNode, return)
    ],
    [     have(file(F)) ],
    [     acid( bringing(file(F),HomeNode) ) ]
).
```

The action of the second action definition is the goto_with_goal command, a migration command having a sub-goal. When this command is used in planning, a goto_with_goal command of the execution machine is coded in the script the plan generates. In the second action, before the goto_with_goal command, the agent database update command update_agent_base is executed, this having the effect of explicitly informing the agent of the return status of the agent. When this command is executed, the following fact is added to the agent database.

info(myself,returning).

The operations of these two execution machine commands update_agent_base and goto_with_goal have the effect of providing an opportunity for replanning, by means of the "returning" subgoal, even in the case in which the operation of returning from the current node to HomeNode temporarily fails due to a fault or the like on the network.

The pre-condition of the second action definition is that the agent has already captured the desired file F, that is, have(file(F)). The post-condition of the second action definition, bringing(file(F),HomeNode), indicates to the planner when this action is used, that the agent status is that it has captured the currently desired file F, and that it has returned to HomeNode.

(2-1-3) goto Action

The third action definition defines a command that, in the case in which an agent migration was not possible for reason of some fault on the network, waits a given amount of time open as a method of accommodating this, and retries the migration a prescribed number of times. The contents of the third action definition are as follows.

```
action(wait_and_goto ,
[
wait_and_goto(HomeNode)
],
[    home(HomeNode),returning ],
[    add(return) ]
).
```

The action of the third action definition is a wait_and_go that causes a wait for a given amount of time, after which the migration is retried a prescribed number of times. When this action is used in planning, the above-noted goto_with_goal command is coded in the script that is generated.

The predicate returning that is indicated as the pre-condition of the third action definition indicates that the agent has achieved the prescribed migration, and that it is in status of having returned to the original node, which is HomeNode. The predicate home(HomeNode) which is coded previous to this serves to restrict the variable HomeNode.

The return which is indicated as the post-condition of the third action definition indicates to the planner that, when this action is used, the agent status is that of having returned to HomeNode.

(2-1-4) get Action

The fourth action definition includes a command (such as a put operation or a get operation) that gets an object (file, data, or the like). By having the agent carry the gotten object to its migration destination, the agent brings it back to a generated node.

That is, this action is with regard to a specific characteristic agent status, and with regard to the getting of a file by the agent. The contents of this action definition are as follows.

```
action( get ,
[
check(file(F), HomeNode, maybe(exist( file(F), Node))),
get(file(F))
],
[
    seeking_for(file(F),HomeNode,Node),maybe(exist(file(F),Node))
],
```

-continued

```
[    add( have(file(F))) ]
).
```

The action of the fourth action definition has two commands coded in it. When the check command is actually executed, a check is made as to whether or not the file F actually exists at the node where the agent is located and, if the file does not exist, the execution of the script by the agent fails. The first argument HomeNode of the check command indicates the location of the knowledge base which forms the basis for checking, and the second argument maybe(exist (file(F),Node)) is the knowledge that is the basis.

The predicate returning that is indicated as the precondition for the fourth action definition indicates that the agent achieved the prescribed migration, and that it is in the status of having returned to HomeNode. The predicate home (HomeNode) which is coded previous to this serves to restrict the variable HomeNode.

The have(file(F)) which is indicated as the post-condition of the fourth action definition indicates to the planner that, when this action is used, the agent status is that of having returned to HomeNode.

(2-1-5) put Action

The fifth action definition is with regard to an agent copying a file. The contents of the fifth action definition are as follows.

```
action( put,
[
put(file(F)),
update_field_base( add( HomeNode, exist(file(F),HomeNode)) )
],
[    bringing(file(F),HomeNode) ],
[    add(exist(file(F),HomeNode)) ]
).
```

The action of the fifth action definition has two commands coded in it. The put action copies the file F of the agent to the node at which the agent is currently located. The agent having copied a new file, the update_field_base command adds information with regard to this file to the file database of the node at which the agent is currently located.

The predicate bringing(file(F),HomeNode) which is indicated as the precondition of the fifth action definition indicates to HomeNode that the agent is carrying file F. The add(exist(file(F),HomeNode)) indicated as the post-condition of the fifth action definition indicates to the planner that the file F exists at HomeNode as a post-condition when the copying by the agent is completed.

(2-2) Database Coding Example

The following is an example of database coding, illustrating a node database, in the second embodiment.

info(node0, maybe(exist(file(file1),node1))).

info(node0, home(node0)).

This database shows the example of the coding of the database at the node node0. The code in the first line of this database is the knowledge, at node 0, that the file file1 exists at node node1. however, node0 and node1 are on different hosts and this type of information with regard to another node is not necessarily correct in a network in which updating of information is performed constantly. The maybe information is information with regard to another node such as this. The code in the second line is adopted in the second embodiment to represent the fact that the node node0 is indeed node0.

The envisioned goal in the above example is the getting of the file file1 at the node node0. If it is known beforehand that the file file1 is a file that was created by a specific person that uses node1 or node2, it can be hypothesized that the file file1 exists at either node1 or node2. This fact is represented in the following manner in the database, in the field make of node node0 which serves the role of a collection point for the file file1. This database, as described in the case of the first embodiment, can take the approach of automatically adding to the database, using an agent of a different field belonging to the same network, or using separate application software.

In this example, for the purpose of simplicity, the node database and node action base are assumed to be empty. In this case, the field database of the field make at node0 is as follows.

info(node0, home(node0)).
info(node0, exist(file(file2),node0)).
info(node0, maybe(exist(file(file1),node1))).
info(node0, maybe(exist(file(file1),node2))).

In the above, in the second embodiment the predicate info is a predicate that explicitly indicates that this is database code, this having two arguments. The predicate info in the second embodiment is expressed by only by its head part, this being a so-called Prolog fact. The first argument in the head of the predicate info explicitly indicates the node location of the information, and in this field database code example, its contents are all node0. The second argument of the head of the predicate info has substantial information, this being expressed using a Prolog item (called a term). In this example of code, the specific meaning is as follows.

TABLE 8

| | |
|---|---|
| home(node0) | The home node of this field is node0. The file is collected at node0 by agent operation. |
| exist(file(file2),node0) | The file file2 exists at node0. |
| maybe(exist(file(file1),node1))) | The file file1 is presumed to exist at node1. |

The difference between the information exist(file(file2), node0) and the information maybe(exist(file(file1),node1))) is that in the former is information with regard to a file that exists at node0, to which the database in the code example belongs, this being a type of information that can be stated in the database as a fact, whereas the latter maybe predicate code is with regard to node1, which is a different node as viewed from node0, and in a network in which change is assumed to occur, this reflects the fact that it is not always possible to guarantee the correctness of the code with regard to node0.

Therefore, the meanings of the four info predicates in this field database are as follows.

The node which this field belongs to is node0.

The file file2 exists at node0.

The file file1 is presume reasoned to exist at node1.

The file file2 is also presumed to exist at node2.

The following contents are stored in the field database at node1. This is a maybe predicate with regard to file1, based on the pre-knowledge that it exists at either node1 or node2.

info(node0,maybe(exist(file(file1),node2))).

In the same manner, the field database at node2 has the following maybe information stored in it.

info(node0,maybe(exist(file(file1),node1))).

The maybe information discussed herein is one type of info predicate presented earlier. This forms part of the info predicate included in each of the databases, these being the agent database, the field database, and the node database. The above-noted information is given to the planner when the agent transitions to the planning phase. These info predicates are the pre-condition which are required for the planner to select an action.

(2-3) Goal Input and Agent Generation

In a data-processing apparatus according to the second embodiment holding information as described above, when a goal is given to a node, the node manager 15 generates an agent process 17, and the planner 13 performs planning. In the second embodiment, the planner 13 is started up by having a goal given. In the above-noted planner implementation using Prolog in the second embodiment, a script is generated which uses the agent name as a file name, by giving goal coding as a Prolog query. In the second embodiment, if a goal is predicated upon the contents of the above-described databases, it is possible to code this in the following manner.

(Example) exist(file(file1),node0)

This goal is the acquisition of the file file1 at node node0 or, stated in other terms, the copying of file1, which currently does not exist at node0, from another node, causing it to exist at node0.

A specific example of applying this goal to the planner 13 is the issuance of the following query to the above-noted planner 13. This goal is validated by combination with the above-noted action base and database.

(Example) :-plan(exist(file(file1),node0),_).

The agent generation is executed by giving this goal code to the node manager 15 of the field make of node0. This operation is performed by using a prescribed input/output means.

Figure 15:
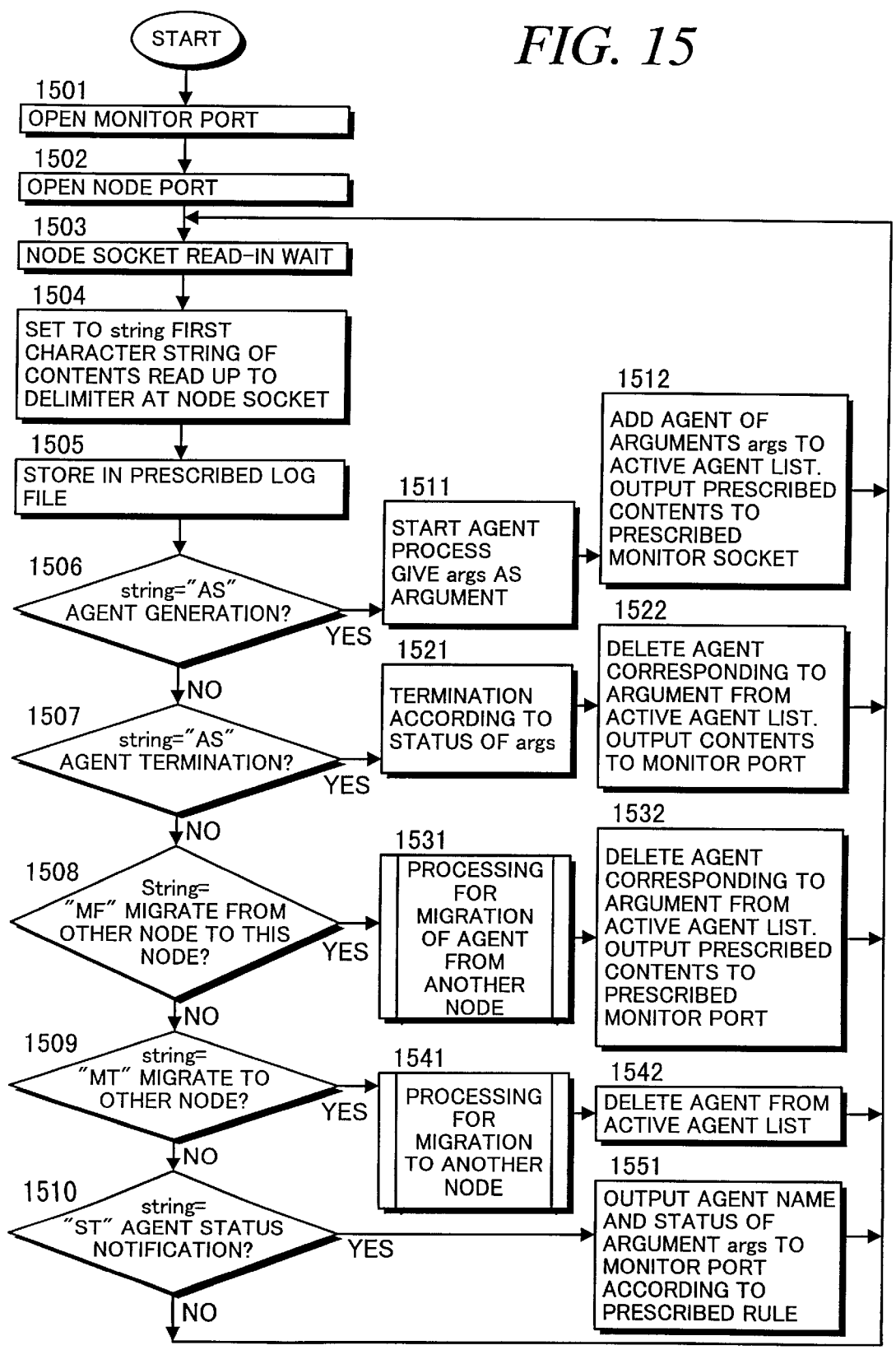
FIG. 15 is a flowchart which shows the operating procedure of the node manager in the second embodiment of the present invention.

The operating procedure of the node manager, including the generation of an agent, is shown in FIG. 15. The node manager has a list AL (active agent list) into which is stored agents (active agents) which exist at the associated node (FIG. 13). The node manager 15, as shown in FIG. 15, receives (steps 1501 through 1505) the communication contents from the node port NP (FIG. 13) as instructions from another node manager or agent process and, in response to the given instruction character string (steps 1506 through 1510) performs agent generation (steps 1511 and 1512), deletion (steps 1521 and 1522), or migration (steps 1531 through 1533), and updates the active agent list accordingly.

While the node manager 15 establishes the details of processing at each interface by interpreting the received contents of code received in this manner, the actual method of transmission can be any of a variety of methods that can be freely selected as desired.

An agent process 17 (FIG. 7) that is generated by the node manager 15, under the control of the node manager 15, implements the overall operation of agent A. The node manager 15 can simultaneously generate a plurality of agent processes 17.

After agent generation, an agent name is given to the agent by the node manager 15. Because the agent is migrated between nodes in the network, to identify the agent, it is necessary to assign a name to it that is unique throughout the network. The node manager 15 assigns an agent name that is unique throughout the network to a generated agent, combining the such information as the node name, the current time, and the number of agents that have already been generated. The generated agent, as described below, has the three phases of planning, execution, and migration, entering these phases as required.

(2-4) Plan Generation

When a goal is given and an agent is generated, the planner 13 performs planning with respect to the given goal. By giving the goal exist(node0,file(file1)) to via a prescribed input/output means, an agent is generated, this agent then entering the planning phase. That is, the agent pushes the goal script set onto the goal stack and starts the planner 13 to perform the planning.

Figure 16:
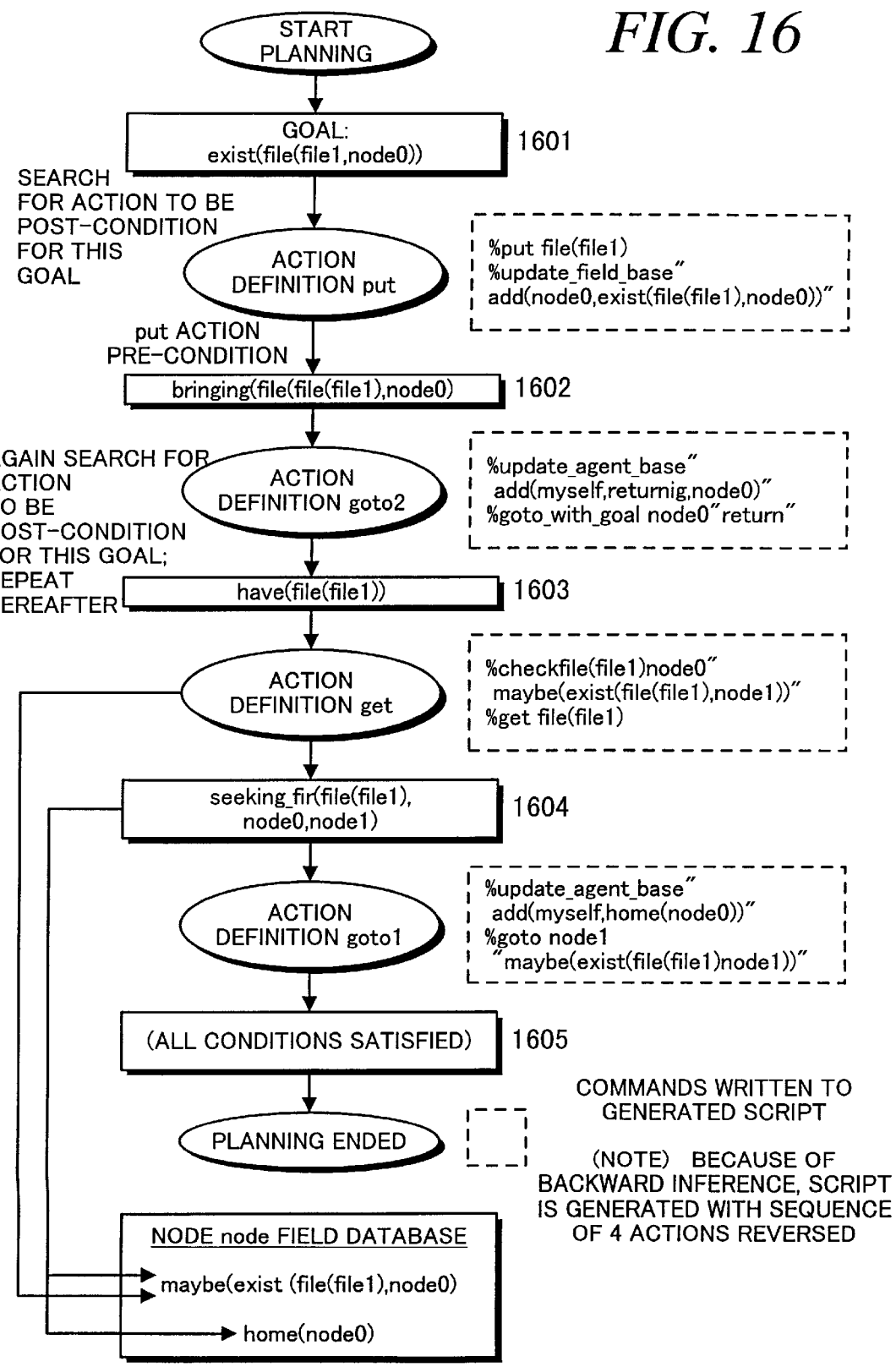
FIG. 16 is a flowchart which shows the details of planning in the second embodiment of the present invention.

FIG. 16 is a conceptual flowchart showing internal contents of the planning process, which illustrates a known planning technique. Specifically, in the second embodiment, the planner 13 performs backtracking, and determines a series of actions to satisfy the goal, while referencing the pre-condition and post-conditions. Stated in other terms, FIG. 16 is a simplified representation of the actual planning process, this being a simplification in which the unification of variables and atoms actually occurring in the Prolog operation have been omitted.

In this planning process, similar to the case of the first embodiment, an action definition is searched for which has the goal as a post-condition. Then, action/,definitions are searched for which have post-conditions that are goals that are the pre-conditions of the above-noted found action definitions. They are output to a plan script, and the same type of procedure is further repeated with the output action as a goal to generate the plan. More specifically, the procedure is repeated, tracking back from a goal (step 1601) through the actions put, goto2, get, and goto1, until all conditions are satisfied (steps 1602 through 1605). Because this search is performed in reverse direction from the goal to the current condition, the sequence is the reverse of the selected action definitions, the contents of the actions in the action definitions, these being command sequences, are generated as a script. When this is done, if it was not possible to satisfy all conditions, regardless of what sequence of action definitions was used, the planning fails.

By means of the processing shown in FIG. 16, the planning results shown below are obtained as a script, based on the field knowledge base of the field make and the action base of node0. The numbers at the left edge are line numbers.

1 %update_agent_base "add(myself, home(node0))"
2 %goto node1 "maybe(exist(file(file1), node1))"
3 %check file(file1) node0 "maybe(exist(file(file1), node1))"
4 %get file(file1)
5 %update_agent_base "add(myself, returning, node0)"
6 %goto_with_goal node0 "return"
7 %put file(file1)
8 %update_field_base "add(node0, exist(file(file1), node0))"

When planner 13, as shown by the command goto (second line) in Table 6, generates a migration command which moves an agent between nodes as part of the plan, it adds a pre-condition that is a prerequisite for this command (claims 19 and 26). This means that the basis of the migration to node1 is "maybe(exist(file(file1),node1))".

When appending the above-noted pre-condition to a migration command, all or part of the pre-condition is made an added parameter of the migration command.

In this manner, in the second embodiment a pre-condition is added to a migration command (as a basis). In the case in which the migration based on such a migration command fails, the most likely cause is a failure to achieve the pre-condition which is a prerequisite of the command. This pre-condition is appended to the command and can easily be identified by referencing the command, thereby facilitating the accommodation of a failure to migrate.

The planner 13 reads in the node actionbase and database, the field action base and database, and the agent action base and database before performing planning. In the second embodiment, the above is collectively referred to as the knowledge base. In the implementation using Prolog in the second embodiment, as already indicated, because the information in each of the databases is represented by a Prolog clause, it is possible to use the Prolog assert to read in all of the above-noted knowledge bases before planning.

By the above-noted query, a script with the file name "script" is first generated. Then the agent process changes the file name in accordance with the corresponding characteristic agent name, so as to distinguish this from the scripts of another agent that might exist simultaneously therewith. In the case of simultaneous planning by a plurality of agents, of course, because both are parallel processes, synchronization of agent operation is required with regard to file generation and deletion, and by making use of an appropriate locking mechanism, it is possible to have a plurality of agents exist simultaneously at one and the same node.

Planning will either succeed or fail, depending upon the contents of the node knowledge base, the field knowledge base, and the migration knowledge base. In the case of successful planning, a script is generated as the output of the planning, and the agent transitions to the execution phase. In addition to a goal which is given to an agent at the time it is generated, it has a goal stack capable of storing a plurality of subgoals for the purpose of recovering from a midway failure. If the planning of a subgoal fails, planning is done by a further upstream goal. If ultimately all planning fails, this condition is taken to be the total failure condition, in which case the agent is terminated.

Because the above-noted script is obtained as a result of planning process, the agent stores this in the goal script set on the very top level of the goal stack. Then, the agent transitions to the execution phase.

In planning, it is possible to generate intermediate subgoals for the purpose of achieving the ultimate objective goal, and to generate child agents for the purpose of achieving these intermediate goals (claim 20). By doing this, because the task of generating a intermediate goal is left up to a child agent, the data processing performed by each agent is simplified, thereby improving the efficiency of data processing. By operating a plurality of agents either in parallel or in series, data processing can be performed at high speed.

(2-5) Plan Execution

When a script is coded, the agent uses the execution machine 14 to enter the execution phase. As will be described later, the script is a command series which has a control structure. In the execution phase, the agent performs interpretation and sequentially executes commands in accordance with this control structure.

Figure 17:
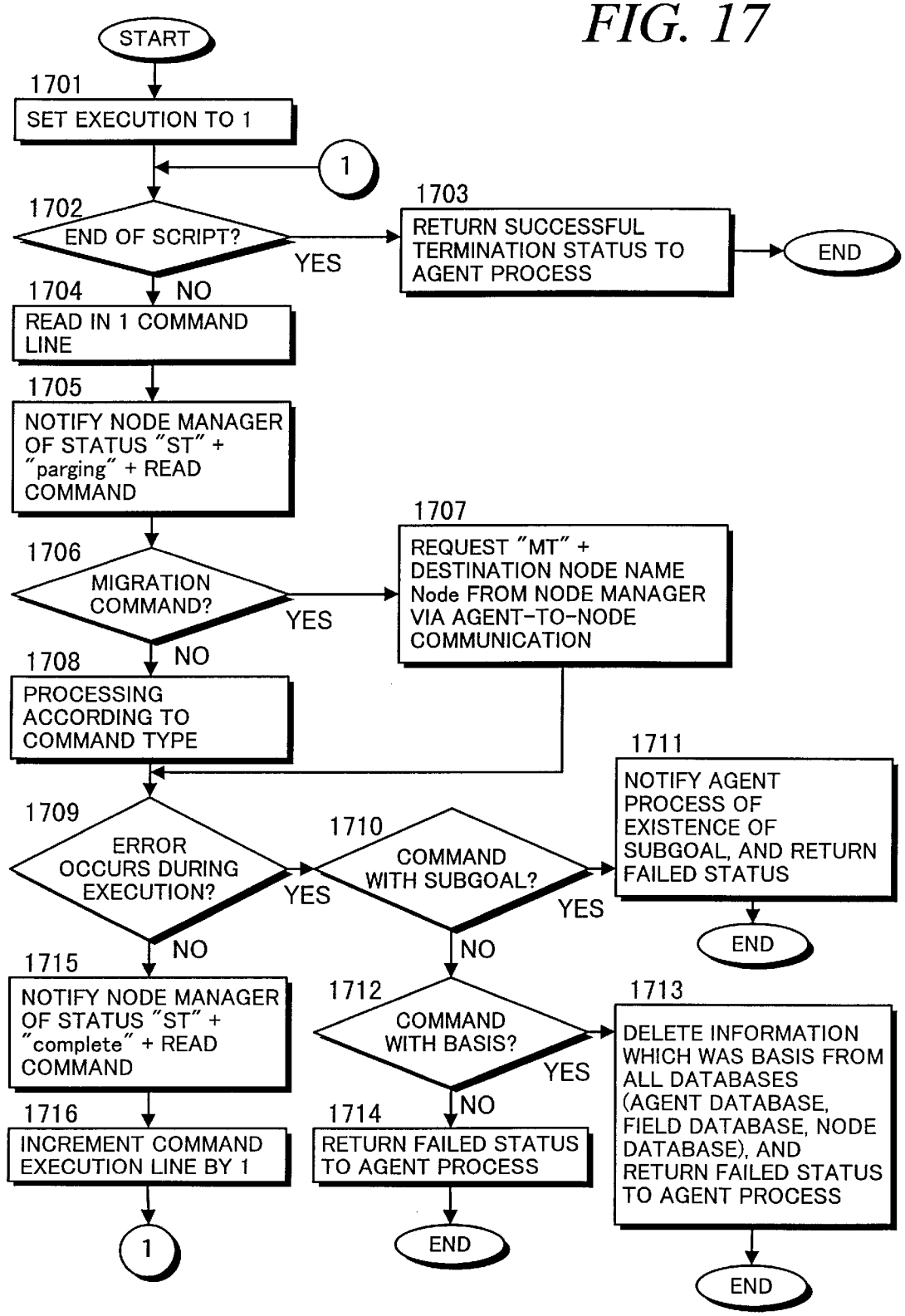
FIG. 17 is a flowchart which shows the operating procedure for plan execution in the second embodiment of the present invention.

FIG. 17 is a flowchart which shows the procedure for executing a plan. In this procedure, each command is read one line at a time as the execution number is incremented until the end of the script is reached (steps 1701 through 1714, 1715, and 1716). If a migration command is encountered, a request is made to that effect to the agent manager (step 1707), and for non-migration commands, processing is performing in accordance with the type of command (step 1708). If an error occurs during execution (step 1709), prescribed error processing is performed (steps 1710 through 1714), depending upon the type of command that caused the error.

Specifically, the execution machine 16 reads in the script, parsing the commands one line at a time, interprets the command name and script, and executing the commands of the table presented above, in accordance with the command type. Although a number of variations can be envisioned for the syntax of the script executed by the execution machine 16, the selection of what syntax is to be interpreted by the execution machine 16 is not intrinsically related to the present invention, a feature of the present invention being that commands such as those shown in the table, such as migration commands, database updating commands, and commands which explicitly give information be used as a basis are provided in the execution machine. By providing these commands, it is possible to given an agent an appropriate subgoal or to perform appropriate updating of a database in accordance with changes in the network.

If a command execution fails, or when a replan command is made, return is made to the planning phase for the purpose of performing planing based on a prescribed goal. If a migration command is given, transition is made to the migration phase.

(2-6) Agent Transfer

If the execution machine 16 encounters a migration command while executing a script, it notifies the node manager 15 of that effect, and sends the agent to the other node. The information that is actually sent for the purpose of migrating the agent consists of the script, the agent, the goal stack, and the agent knowledge base. If the sending of all of this information to the migration destination node succeeds, the agent returns to the execution phase at the destination.

(2-6-1) Transfer of an Agent to Another Node

Figure 18:
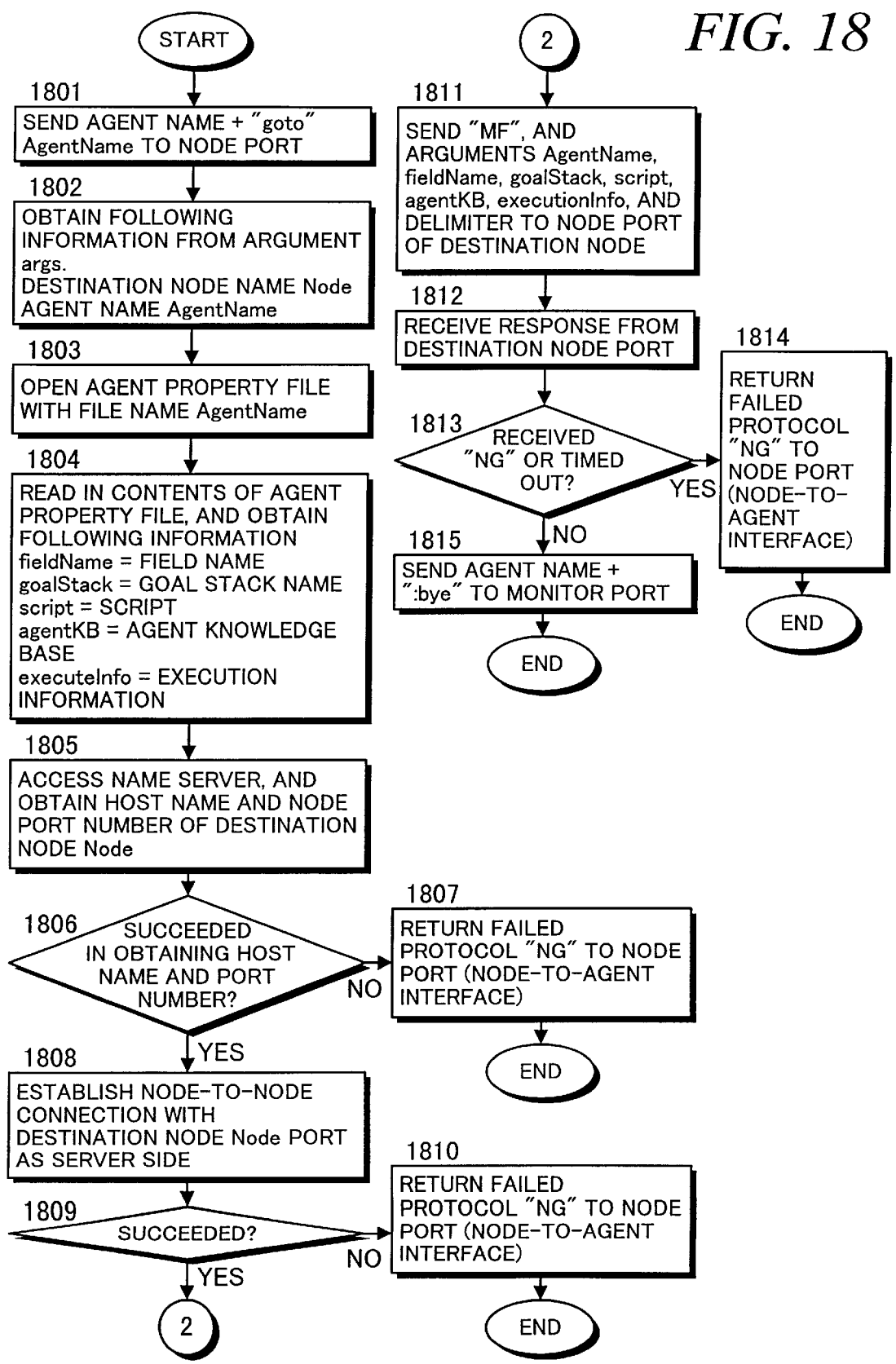
FIG. 18 is a flowchart which shows the operating procedure of the node manager at the migration origin in the case of migrating an agent between nodes in the second embodiment of the present invention.

FIG. 18 is a flowchart which show the operation of the node manager 15 at the migration destination node when an agent is migrated to another node. Specifically, in addition to collecting the information that is required with regard to the agent (steps 1802 through 1804), the node manager 15 attempts communication migration treating the destination node as the host (steps 1805 and 1808) and, in the case in which it fails to establish the communication path, abandons the migration (steps 1806 and 1809), notifies the agent process of the failure (steps 1807 and 1810). If the communication path was established, it sends the required information to the migration destination and waits for a reply (steps 1811, 1812, and 1815). Even if the node manager 15 could establish the communication, if it could not receive a reply from the other node, it will also treat this as a migration failure (step 1813), and notifies to the agent process (step 1814).

(2-6-2) Transfer of an Agent From Another Node

Figure 19:
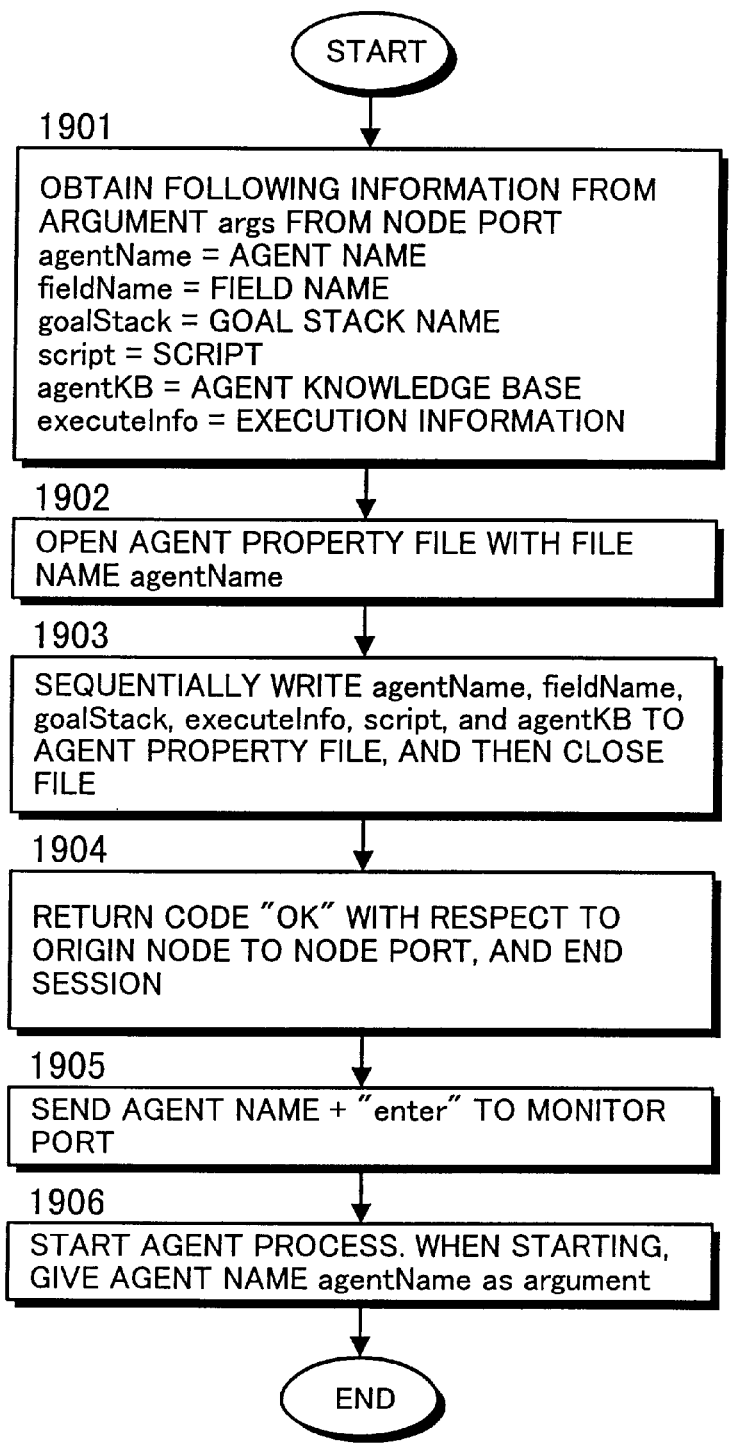
FIG. 19 is a flowchart which shows the operating procedure of the node manager at the migration destination in the case of migrating an agent between nodes in the second embodiment of the present invention.

In response to the processing shown in FIG. 18, the node manager 15 at the destination node accepts the agent by the processing which is shown in FIG. 19. Specifically, when the node manager 15 receives at its node port a protocol MF from another node, it accepts the required information (step 1901), allocates resources to the new agent (step 1902), and stores the new agent information in a prescribed area (step 1903), after which response to the migration origin that the migratesucceeded (steps 1904 and 1905) and starts the agent process (step 1906). Should an abnormality occur during this processing, processing is performed by means of exception processing such as in object-oriented programming languages such as Java or C++.

Figure 20:
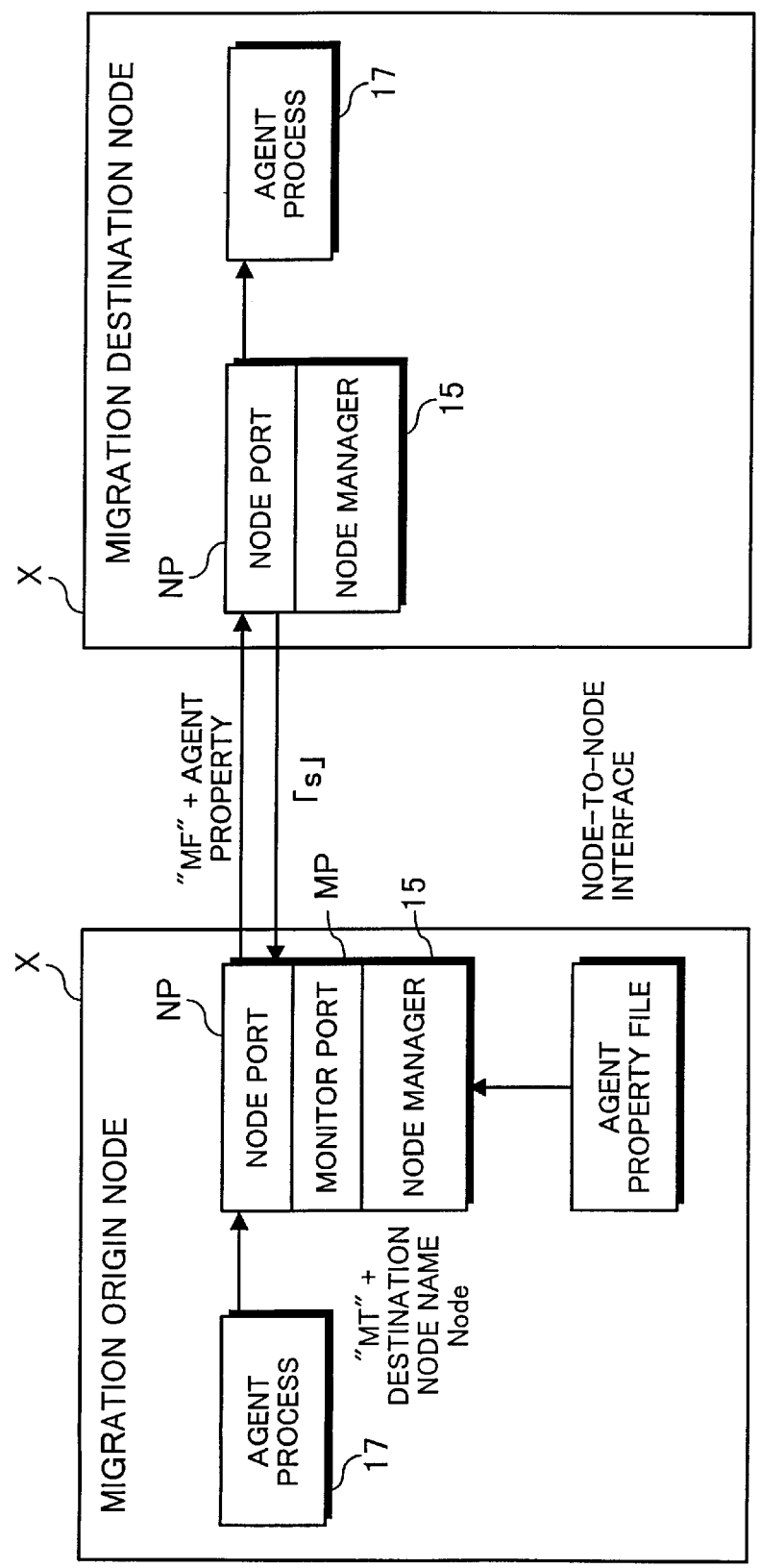
FIG. 20 is a drawing which shows the state of agent migration between nodes via a node manager in the second embodiment of the present invention.

FIG. 20 is an auxiliary drawing which shows how the agent is migrated, using the agent-to-node interface and the node-to-node interface. The agent is indirectly migrated, via the node manager.

(2-7) Handling Failures

If the execution of a script or a migrateshould fail, that is, if the plan execution should fail, the plan execution is interrupted and a new plan is generated and executed (claims 21 and 27). One mechanism for a failure occurring is, for example, the occurrence of an error or exception condition. In the second embodiment, even if the plan execution or migration fails, because replanning is done to generate a new plan, data processing is continued smoothly.

More specifically, if the execution of an action or a migration fails during a plan, a subgoal is generated so as to recover from the failed execution or migration, data being held for the restarting of the original plan after completion of the satisfaction of the subgoal, and generation and execution of the plan being performed based on the above-noted subgoal. Then, after execution of the plan based on the subgoal, the above-noted stored information is used to continue execution of the original plan (claim 22).

For example, if an agent migration based on a go command fails and also there is no basis appended to this go command, the goal that generated the current script is used as a goal once again to perform replanning. A migration can fail in the case in which the network connection to the migration destination node has not been established, in the case in which migration is not completed within some given period of time, and in the case in which it is not possible at the migration destination to obtain the required resources, such as memory or disk space. In such cases, the migration is treated as having failed, and return is made to the planning phase, based on a prescribed subgoal.

It is desirable that such a failure be detected at the migration origin. For example, when an agent is executing a go command, at the node manager that controls agent migration, if there is some problem at the destination node that prevents migration of the agent, the agent migration failure is detected at the origin for the migration.

The generating of a subgoal to generate a plan when a failure occurs means that, it is possible to shift to planning phase, if necessary, even when in the execution phase. Types of information that can be envisioned as the above-noted held information include such information as the original goal, the original script, and the script execution position, this information being storable by pushing it onto a goal stack. Then, planning is performed starting with the lowest order subgoal of the generated subgoals, the thus-generated plan is then executed. After execution, to restart the original plan the above-noted information is taken off the stack.

In the second embodiment, if planning, plan execution, or migration based on the plan fails, the information which was the cause of the failure is corrected (claims 23 and 28). By doing this, subsequent failures are reduced, thereby improving the efficiency of data processing. For example, if the execution machine 16 fails to execute a go command that has a pre-condition given explicitly as a parameter, it is removed from the logical information, that is, from the field database.

The manner of generating a subgoal and correcting information can be based on a definition previously defined for individual actions or for individual migrates, can be based on a definition in terms of any of the information used in generating the plan, and can also be based on local information or the like.

In this manner, in the second embodiment, including the case in which it is necessary to handle a failure condition, a subgoal is generated in execution of a plan and a further plan is generated and executed with regard to the subgoal, thereby processing data by using a hierarchical goal structure. In this case, when an agent is migrated by means of a go action, since it is migrated along with a hierarchical goal stack, it is possible even at the migration destination node to use the goal stack to perform seamless operation using this same goal stack.

To perform smooth replanning in this manner, a replanning command is used as one type of command making up the plan, and when this replanning command is executed within the execution of a plan, the plan generating means generates a subplan.

If planning fails after a migration, in the case in which it is ultimately not possible to generate an action which achieves the pre-condition, the script is made to failure terminate, return is made to the node before the migration, and replanning can be done using the goal that was stored on the stack. In the case in which the generation of a plan with respect to the goal is ultimately impossible, and in the case in which an unexecutable goal is received, electronic mail or other means can be used to make a notification to the sender, if necessary.

Another possible form of error handling is that in which the means which generates the plan adds to the plan a script which verifies whether or not the pre-condition that is prerequisite for the plan has been satisfied at the time of execution. By doing this, a condition at the time of the generation of the plan is verified at the time of execution. That is, because there is an inevitable time interval between the time when the planning is performed and the time the generated plan is executed, a condition that was satisfied at the time of planning might no longer be satisfied at the time of execution. By verifying the pre-condition, it is possible to assure the proper execution of the plan.

(2-8) Termination Processing

One example of termination processing is in the case of a successful data processing by an agent, in which case the issuer of the goal is notified of the success by mail, and notified of failure in the case of failure. Other various forms of termination processing can be envisioned, and it is possible when an agent is generated to add information with regard to the type of termination processing to perform, thus enabling variations in termination processing.

(2-9) Detailed Agent Operation

Figure 21:
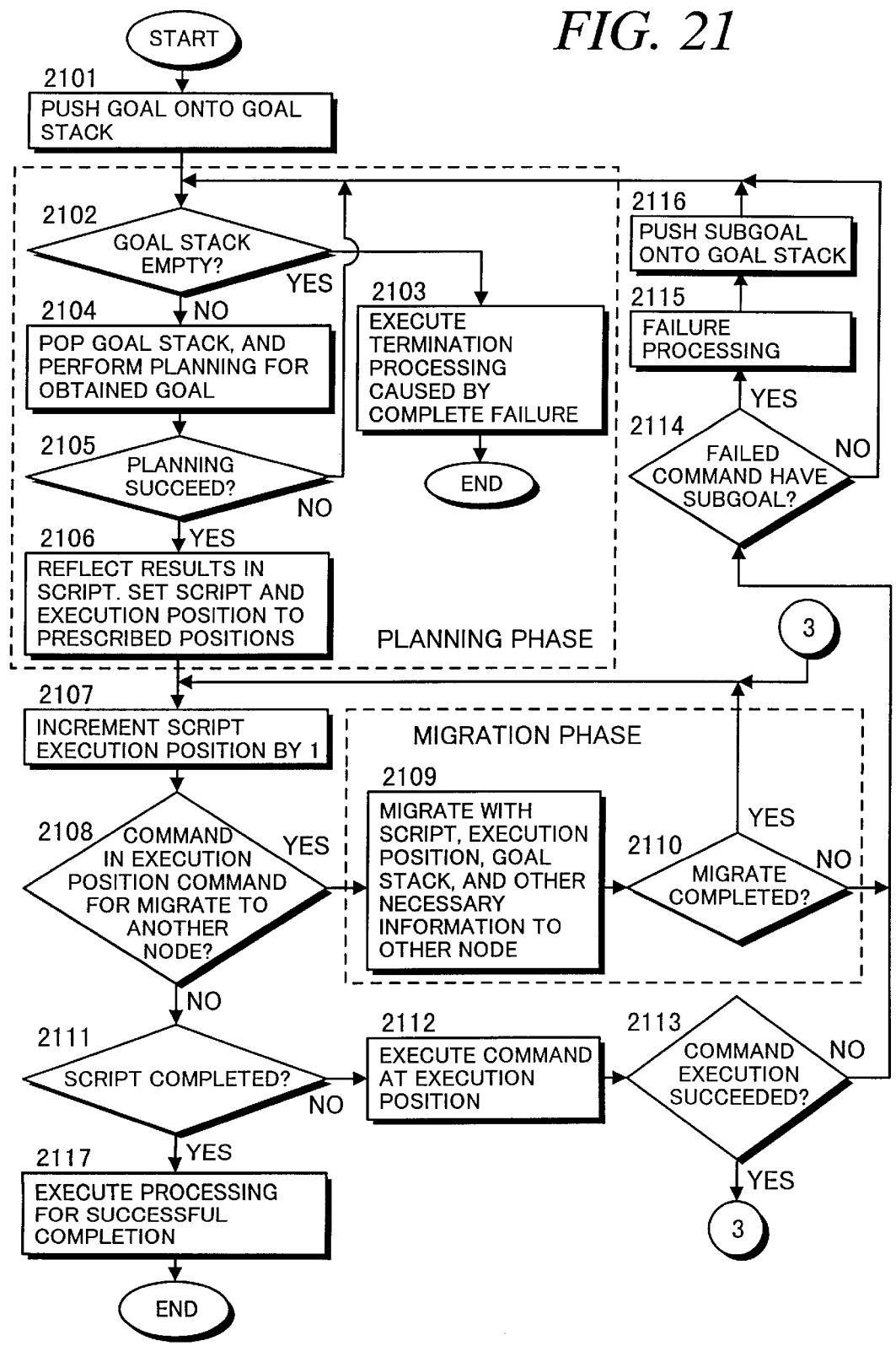
FIG. 21 is a flowchart which shows the operating procedure of the agent in the second embodiment of the present invention.

Each of the above-described operations are shown in the flowchart of FIG. 21, which shows the processing procedure, focusing on the agent. Specifically, at the time an agent is generated, when a goal is received from the node manager, this goal is pushed onto the goal stack (step 2101). A check is made to see whether the stack is empty (step 2102). If the stack is empty, the judgment is made that this agent has completely failed to achieve the goal, and the termination processing to be described later is performed, thereby effecting a termination (step 2103).

If the goal stack is not empty, a goal is popped from the goal stack, and planning, to be described later, is performed with respect to this goal (step 2104). If the planning fails, return is made to the step that checks the contents of the stack (step 2105).

If the planning succeeds, a script is generated (step 2106). When this is done, the script execution position is updated (step 2107), and a transition is made from the planning phase to the execution phase.

In planning and generation of a script, in planning immediately after the generation of a new agent, a new script is generated. In planning and script generation, in the planning generated immediately thereafter, the results of planning are added to the script that existed immediately before planning. In planning and script generation, if planning does not succeed, return is made again to the check of whether or not the goal stack is empty.

If the plan generation succeeds, transition is made to the interpretation and execution of the script. The interpretation and execution of the script is processed by the execution machine of the agent, which is to be described later. The operations of interpreting and executing the script are basically the same as with an interpreter type of language, such as BASIC or the like. The execution machine, by moving from the current script execution position to the next position reads in commands, interprets the type of command and the arguments, and executes the commands.

In the interpreter part of the execution machine, if the command in the current execution position is a migration command (goto) (step 2108), shift is made to the migration processing step. At the migration processing step, migration processing, to be described later, is performed. Transfer processing is processing which bridges across nodes and is performed by the node manager, and processing in which the agent disappears from the migration origin and is reproduced at the migration destination (step 2109). When this migration is completed (step 2110), the processing shown in the flowchart of FIG. 21 is continued at the migration destination node.

If the migration fails (step 2110), a check is made at the migration origin as to whether the migration command is accompanied by a subgoal (step 2114). If it is a migration command without a subgoal, in order to enter the planning phase, return is made to the step at which a check is made as to whether the goal stack is empty. If the migration command was one with a subgoal, the failure processing to be described later is performed (step 2115), the subgoal is pushed onto the goal stack (step 2116), and return is made again to the planning step.

In the case in which the command at the execution position is not a migration command (step 2108), a check is made by the execution machine as to whether or not the script has ended (step 2111). If the script has ended, the judgment is made that the agent has completed successfully, successful termination processing is done, thereby effecting termination (step 2117).

If at step 2111 the script had not ended, the command at the execution position is interpreted and executed (step 2112). In this processing, if the command execution succeeds, return is made to the processing at step 2107. If the command execution fails, transition is made (at step 2113) to the processing at step 2114.

The foregoing is the behavior as seen from the migrated agent. To achieve the overall originally given goal, the agent generates a script and executes a behavior in a seamless manner based on the script.

(3) Script Execution and Node Transfer Examples

Figure 22:
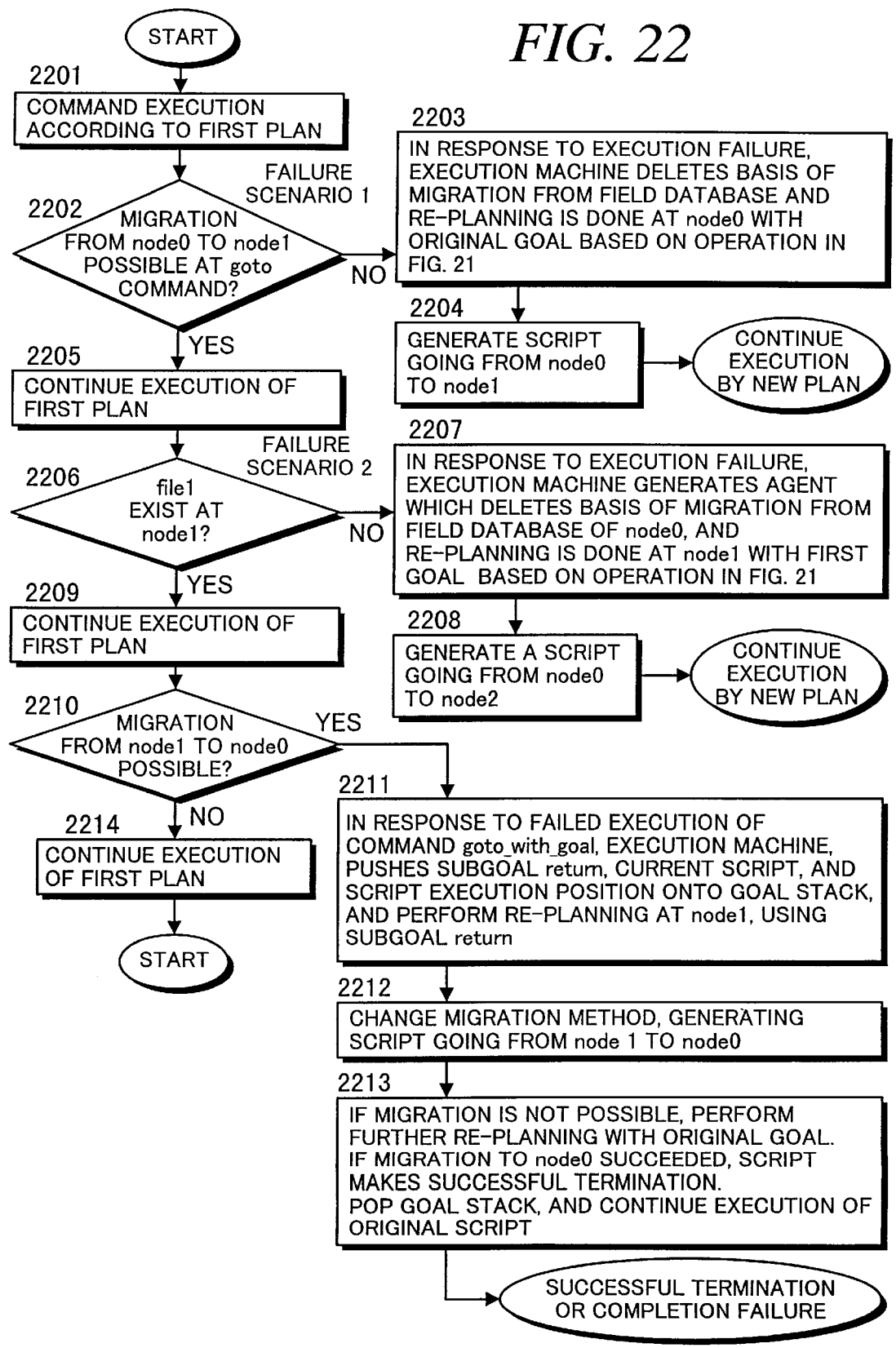
FIG. 22 is a flowchart which show the approach to plan execution in the second embodiment of the present invention.

Turning next to the behavior of the agent in the execution phase in which it executes a script generated by the planner and in the migration phase, the above-described script (hereinafter referred to as the first script) will be described as a specific example. FIG. 22 is a flowchart which shows the processing in this example, including the handling of failure conditions.

(3-1) Successful Example

First, a specific example will be presented in which all of the assumption at the planning stage were correct and in which no execution error occurred.

By executing the first line of the above-noted plan, which is

%update_agent_base "add(myself,home(node0))",
the information info(myself,home(node0))
is added to the database of the agent (step 2201). This operation is required in order to inform the planner of the agent's own departure (origin) node in the case in which a subsequent script execution fails for some reason and it is necessary to perform replanning.

Next, by executing the second line, which is

%goto node1 "maybe(exist(file(file1),node1))", a migration command to node1 with a basis, the agent is migrated to node1 (step 2202). The effect of the basis argument will be described later.

Then, by executing the third line, which is

%check file(file1) node0 "maybe(exist(file(file1), node1))", a verification is performed as to whether the file file1 actually exists at node1 (step 2205). In this example, just as assumed in the planning, we will take the case in which file1 indeed existed at node1, in which case the second and third arguments of the check command have no meaning.

Then, by executing the fourth line, which is

%get file(file1), the file file1 which is gotten from node1, which is the migration destination, is made a file owned by the agent (step 2209). Thereafter, until the agent puts this file, it carries the file with it when it is migrated.

By executing the fifth line, which is

%update_agent_base "add(myself,returning,node0)", the information info(myself,returning,node0)

is added to the database of the agent (step 2209). This operation is for the purpose of reflecting in the planning the fact that the agent is in the returned state when replanning is done because of a failure of the agent to return to node0 for some reason.

Then, by executing the sixth line, which is

%goto_with_goal node0 "return", the agent is migrated to node0 (step 2209). By executing the seventh line, which is %put file(file1), file1, a file possessed by the agent, is copied to node0 (step 2214). And finally, by executing the eighth line, which is %update_field_base "add(node0,exist(file(file1), node0))", the agent adds info(exist(file(file1),node0)) to the filed database of node0 (step 2214). As described above, as long as the agent does not experience an execution error during execution of the script, the originally given goal is achieved.

(3-2) Failure Example

Next, consider the case of agent operation during replanning execution based on a failure. Planning that was performed at node0 is no more than planning which uses information knowable at node0. In actuality, because the state of each node connected to the network and the state of the network change with time, the execution of a script that is generated by planning might file midway.

The following types of agent execution failures can be envisioned.

(1) A node or the network fails to operate temporarily due to a failure, maintenance, or an overload.

(2) The contents of a database used for planning by the agent were in error.

(3) The contents of a database have become dated by the passage of time.

As shown in FIG. 16, in this operation example, the following cases can be imagined.

The failure of a minigration of an agent from node0 to node1.

The failure of an agent to get a file, because file1 does not exist at node1 (but rather exists at node2).

The failure of an agent to migrate from node1 of file1 to node0.

The following is a description, of the manner in one example of a data-processing apparatus according to the present invention handles such cases as noted above.

(3-2-1) First Failure Example

First, consider the case in which, at the second line of the script %goto node1 "maybe(exist(file(file1),node1))" (step 2201), the migration from node0 to node1 by a goto command with a basis fails (the failure scenario 1 in FIG. 22). In this case (step 2202), the node manager performs the operation shown in FIG. 18, notifying the agent that migration is not possible. In this case, the execution machine of the agent, in response to this, deletes the information which was the basis for migration at the time of planning, that is, the knowledge of the third argument, from the node, field, and agent databases (step 2203). By deleting the basis, the databases are changed as follows.

First, because in the case of the second embodiment the node database of node0 has no contents, there is no change. In the case of the agent database, by executing the update_agent_base command in the first line of the first script beforehand, the single clause info(myself,home(node0)) is added, because there is no maybe predicate in the agent database, there is no change made.

Because the contents of the database of the field make of node0 at the time of the first failure are as info(node0, home(node0)).

info(node0, exist(file(file2),node0)).

info(node0, maybe(exist(file(file1),node2))).

after this operation, the execution machine returns the execution failure status to the agent process, and the agent transitions to the planning phase. Because the goto command which failed is not a command having a subgoal, based on the operation shown in FIG. 21, replanning is performed using the current contents of the goal stack (step 2204).

The following second script is generated by replanning which makes use of the above-noted field database and agent database, the above-described action base, and the above-described planner.

%update_agent_base "add(myself, home(node0))"

%goto node2 "maybe(exist(file(file1), node2))"

%check file(file1) node0 "maybe(exist(file(file1), node2))"

%get file(file1)

%update_agent_base "add(myself, returning, node0)"

%goto_with_goal node0 "return"

%put file(file1)

%update_field_base "add(node0, exist(file(file1), node0))"

The difference in this script with respect to the first script is the change of the object of the getting of file1 from node1 to node2.

That is, when the execution fails, if the database updating is not performed properly, there is a danger that replanning will result in the same script as the first script, resulting in the same agent failure. In the second embodiment, by using a goto command with an associated basis, the information info(node0,maybe(exist(file(file1),node1))), which is information about the existence of filet at node1, is deleted from the field database. For this reason, when replanning is done, the plan generation is performed using node2, which is the second candidate for the location of file1. Thus, in the second embodiment, there is an improvement in the independence required in a software agent, this enabling an improvement in the ability of an agent to accommodate changes in a network.

(3-2-2) Second Failure Example

Next, consider the case of the behavior of the agent in the case in which, in the first script, the migration from node0 to node1. succeeds, but file1 does not exist at node1 (failure scenario 3 in FIG. 22). In this case, at the check command in the third line of the first script, when the execution machine of the agent that has migrated to node1 performs a check of the existence of file1, because file1 does not actually exist, an execution failure occurs (step 2205).

In the check command, as described in the table of execution machine commands, the second argument is the node at which the basis and origin, that is, the database holding the information that is the basis and origin, and the third argument is information that is the basis. As is the case for the first failure example, in this case as well updating is done of the information that is the basis (step 2207).

However, what is intrinsically different between the first failure example and the second failure example is that the agent has already been migrated to node1 in the second example. Therefore, to update the contents of the database, it is necessary to migrate back again to the original node. By the method of giving the node at which the erroneous database exists explicitly in the check command, both the field database of that node and the node database are updated.

When doing this, one means of updating the database contents would be to use internode communication via the node manager, or to issue a separate goal that updates the information, generating a separate second agent and causing it to perform an independent operation. In any of these cases, it is possible to update a database by the existence of a command with a basis.

In the redone plan at node1, the databases used are the node1 node database, the node1 field database, and the agent database.

In the second failure example, the contents of the agent database in the updating after the failure are info(myself,home(node0)), the contents of the node1 node database are empty, and the contents of the field database of the field make of node1 are info(node1,maybe(exist(file(file1),node2))).

From these two parts of information, similar to the case of the first failure example, when replanning is done with respect to the original goal exist(file(file1),node0) (step 2208), a script similar to the case of the first failure example is obtained. The difference in this case is that whereas in the first failure example the agent is migrated from node0 to node2, in the second failure example a plan is made for migration from node1 to node2.

%update_agent_base "add(myself, home(node0))"
%goto node2 "maybe(exist(file(file1), node2))"
%check file(file1) node0 "maybe(exist(file(file1), node2))"
%get file(file1)
%update_agent_base "add(myself, returning, node0)"
%goto_with_goal node0 "return"
%put file(file1)
%update_field_base "add(node0, exist(file(file1), node0))"

This is because, with the existence of the agent database, it is possible to use the database when the location of the home node of the agent is migrated to another node. Thus, it is possible to maintain uniformity in the agent even when it is migrated.

(3-2-3) Third Failure Example

Consider now the behavior of the agent in the third failure example in which, in the first script, operations up through the getting of file1 at node1 succeeds (step 2209), but in which finally the migration of the agent so as to return it to node0 fails.

This failure occurs in the sixth line of the first script, which is

%goto_with_goal node0 "return".

This is a migration command with a subgoal, the third argument "return" of which is the subgoal. In this example, therefore, even though it is the same migration failure, the method of handling a migration failure by the agent must inevitably be different than in the case of the first failure example.

The execution machine of the agent, by the procedure shown in FIG. 21, receives notification from the node manager of the failure of the migration from node1 to node0 by a command with a subgoal, this being goto_with_goal. In this case, with regard to the script being executed at that time, along with information regarding the current execution position, the subgoal "return" is pushed onto the stack, and replanning is performed (step 2211).

Before executing the command goto_with_goal command, because the contents of the agent database when performing replanning are added to at the fifth line of the first script, they are as follows. The added knowledge "returning" has the effect of explicitly stating that the agent is in the state of returning to node0, which is the home node.

%info(myself,home(node0)).
%info(myself,returning).

Similar to the case of the second failure example, the contents of the database of the field make of the node1 consist of the following line.

%info(node1,maybe(exist(file(file1),node2))).

The contents of the node database of node1 are empty.

The fourth script, which is generated based on these databases and the previously indicated action definition and planner is the following single line.

%wait_and_goto nodez0

This command is a command which causes a wait for a prescribed amount of time and then a prescribed number of attempts to perform a migration (step 2212). It can be envisioned that a temporary problem on the network can cause the previous migration to node0 happens to fail. In this example, the initial agent goal of exist(file(file1),node2)) implicitly requires existence at node0, and it is not necessary to consider the case in which a change in the network causes its disappearance. Therefore, it is appropriate to treat the failure of the migration from node1 to node0 as a temporary failure.

In the case in which execution of wait_and_goto node0, which is the script resulting from replanning, still results in the inability to migrate (step 2213), because there is no further subgoal, the agent is popped from the goal stack, according to the procedure shown in FIG. 21, and replanning is done once again, using the original goal of exec(file (file1)),node1). In this case, the generated script is the same as in the case of the second failure example, this being a migration to node2, followed by return to node0. Additionally, if even the execution of this plan to migrate to node2 fails, the agent is judged to have totally failed. The prescribed termination processing is done, the fact that the node has totally failed being recorded in one of the nodes.

If the execution of wait_and_goto node0, which is the script generated by replanning, results in successful migration to node0, the fourth script succeeds and then ends, the agent being popped from the goal stack according to the procedure shown in FIG. 21, and the execution at node0 of the first script being continued from line 7 thereof. This type of satisfaction of the subgoal has the effect of searching for a substitute means, at the migration destination node, with respect to a local malfunctioning that occurs in the case in which return of the agent is made to node0 in this embodiment.

The existence of a goal stack within the agent and the porting of this stack along with the migration of the agent has the effect of providing a chance to redo the planning with a larger goal in the case in which a local substitute means does not succeed.

While the first action and the second action in the action definition are both migration commands, whereas the first action is a migration for the purpose of finding a file F, the second action is an action definition for an agent to achieve the execution of a prescribed command at the migration destination and then return to the migration departure point.

As described above, in the second embodiment, as indicated by the first and the third failure examples, even in the case of the same migration command, by coding a an action that issues a context-sensitive subgoal in accordance with the agent context, it is possible to code an agent that has the autonomy to enable accommodation of a variety of unexpected changes.

(4) Effect of the Second Embodiment

As described above, in the second embodiment, it is not only possible to migrate an agent between nodes according to a plan, but also to perform further planning at a destination node. For this reason, the actual data processing performed is established in response to the stage of plan execution and state of the destination node, thereby providing an improvement in the efficiency of data processing (claims 16, 24, and 29).

Additionally, in the second embodiment, because only information corresponding to the agent type is used when generating a plan, the efficiency of plan generation is improved. Even when migrating between nodes, because transfer is made to a field corresponding to the agent, it is possible to execute a plan or generate a plan using field information that corresponds in the same manner as before the migration (claims 17, 25, and 30).

Further, in the second embodiment, because the agent is migrated along with its characteristic information, which is used at the destination node as well, it is possible to perform planning that is suited to the individual status of an agent or to an action (claim 18).

3. Other Embodiments

The present invention is not limited to the above-noted embodiments, and encompasses the following examples as embodiments as well. For example, there is no limitation with respect to having mutually independent hardware at each node, configuration being possible with a plurality of processes implemented on one and the same set of hardware. Additionally, there is no limitation to having only one agent, it being possible to have a plurality of agents operating in parallel. Neither is there a limitation of the data processing to file operations, it also being possible to establish the data processing freely to be, for example, calculation, inference, communication with other nodes, and the like.

The contents of the local information are not limited to names of nodes at which a file might exist, it being possible to establish the contents free to be, for example, a domain name, host name, directory name, access ID and password and the like for the purpose of accessing an constituent element.

With regard to the contents of the agent information or the representation format of a plan as well, these were presented as only examples with regards to the above-noted embodiments, and can be freely established. For example, when representing a plan, without using the format in which actions are connected by causal links, it is possible to store an action set in the form of a list structure or a tree structure. In the second embodiment, the method of accommodating failures presented was merely an example, and it is possible to freely establish this as some other method. In the embodiment of the present invention, it is not absolutely necessary to use a structure in which a knowledge base is divided into fields, in which characteristics agent information is used, and in which pre-condition are appended to migration commands. Additionally in the embodiment of the present invention, it is not absolutely necessary to use a structure in which information that results in the failure of child agent generation, or the failure of replanning when an execution failure occurs, or the failure of execution is updated.

In a case in which request code is input that requires that a plan must be generated successfully and executed, in response to the nature of the applied task, it not absolutely necessary to provide a judgment means. Also, the agent need not be set as a process at a node, it being possible to implement it with dedicated hardware or software.

Also, while a data-processing apparatus and data-processing method according to the present invention are typically implemented using a computer program, a storage medium onto which is stored such a program is also one form of the present invention (claims 15, 29, and 30).

As described in detail above, according to the present invention it is possible to provide a data-processing apparatus and data-processing method which flexibly accommodate changes in the constituent elements of software, and which further provide superior immunity to line faults.

What is claimed is:

1. A data-processing system for processing data by an executable process, the system comprising:

a plurality of nodes being connected by a network each node including constituent elements being accessed by the executable process, a first storage part configured to store a first information representing a state of the constituent elements;

a second storage part configured to store a second information representing a series of actions to be executed by the executable process;

a plan-generating part configured to generate a plan representing the series of actions according to the first and second storage information, the series of actions including an action which implements a migration of the executable process between the nodes;

an execution part configured to execute the series of actions based on the generated plan; and a control part configured to migrate the executable process between the nodes based on the generated plan.

wherein the plan-generating part generates another plan representing another series of actions according to the first and second information after the migration of the executable process.

2. A data-processing apparatus according to claim 1, further comprising updating means for updating said first information stored in said first storage means, said updating means including means for updating said first information based on the changed contents of said constituent elements, which are input at each node.

3. A data-processing apparatus according to claim 1, further comprising updating means for updating said first information stored in said first storage means, said updating means including means for updating said first information when a given condition is established, by referencing information corresponding to said network.

4. A data-processing apparatus according to claim 1, wherein said second storage means comprises:

means for storing a set of actions which is the unit for operations of said executable process;

means for storing action information that includes a pre-condition representative of action being executable and a post-condition representative of a change of state caused by execution;

means for storing a prescribed limitation condition of execution of said action; and means for storing information representative of a causal relationship between said actions, said plan-generating means comprising means for storing in said second storage means, for a prescribed action of said action set, at least one of a new limitation condition and said information representative of a causal relationship, based on said action information.

5. A data-processing apparatus according to claim 4, wherein said plan-generating means adding to said action set an action to migrate executable process to said another node with the pre-condition of an action that is to be executed at said another node as a post-condition, sequentially selecting unachieved goals as subgoals, further sequentially selecting actions having post-conditions which achieve said selected subgoals, and for each such selected action storing in said second storage means at least one of a new limitation condition and information.

6. A data-processing apparatus according to claim 5, further comprising a judgment means whereby, when said unachieved goal does not exist, for makings judgment that a plan succeeds and that a request code has been achieved, without proceeding to an execution, and further whereby when an unachieved goal exists and said action set is not empty, making a judgment that a plan succeeds and that execution of a plan is necessary.

7. A data-processing apparatus according to claim 5, wherein said plan-generating means adds to each said selected actions, a selected action which sacrifices a pre-condition of another action to said information corresponding to said causal relationship.

8. A data-processing apparatus according to claim 5, wherein said plan-generating means adds each selected action which sacrifices a pre-condition of another action, and which can be added said limitation condition which prevents the loss of said pre-condition before execution of the other action, to said information representative of said causal relationship and adds said limitation condition.

9. A data-processing apparatus according to claim 5, wherein said control means migrates said executable process based on a first action of said series of actions, and said execution means executes a second action other than said first action before executing said first action, while satisfying said prescribed limitation condition.

10. A data-processing apparatus according to claim 1, wherein:

said executable process is set as a process at a node;

in response to migrating said executable process from said certain node to said another node, sending an acceptance request from said certain node to said another node, to prepare for acceptance of said executable process setting a process for said executable process at said another node which receives the acceptance request, sending a ready notification from said another node to said certain node, sending said first information from said certain node, having received said ready notification, to said another node, starting execution of said process based on said received first information at said another node, having received said first information, and terminating said process of said executable process at said another node.

11. A data-processing apparatus according to claim 1, wherein said plan-generating means generates a new plan using said first and second information when it is impossible for the actions of the executable process to be executed at the designated node based on the plan generated by the plan-generating means. node.

12. A data-processing system according to claim 1, further comprising an updating part configured to update the first information stored in the first storage part and the second information stored in the second storage part, wherein the updating part updates the first information based on the changed contents of the constituent elements, which are input at each of the nodes, wherein the plan-generating part generates another plan representing another series of actions to be executed by the executable process according to the updated first and second information updated in a designated node by the updating part when the updated first and second information is inconsistent with the previous first and second information before the update and because of this inconsistency it is impossible for the actions of the executable process to be executed at the designated node based on the previous plan generated by the plan-generating part according to the previous first and second information.

13. A data-processing method for processing data by an executable process, the method comprising:

storing a first information representing a state of constituent elements to be accessed by the executable process;

storing a second information representing a series of actions to be executed by the executable process;

generating a plan representing the series of actions according to the first and second storage information, the series of actions including an action which implements a migration of the executable process between the nodes;

executing the series of actions of the executable process based on the generated plan;

migrating the executable process between the nodes designated in the generated plan; and generating another plan representing another series of actions to be executed by the executable process according to the first and second information after the migration of the executable process.

14. A data-processing method according to claim 13, wherein said storing second information further comprise s:

storing a set of actions, which is the unit for operations of said executable process;

storing action information that includes a precondition representative of said action being executable and a post-condition representative of a change of state caused by execution;

storing a prescribed limitation condition corresponding to execution of said action; and storing information representative of a causal relationship between said actions, and said generating a plan includes storing for a prescribed action of said action set, at least one of a new limitation condition and said information representative of a causal relationship based on said action information.

15. A data-processing method according to claim 13, wherein:

said executable process is set as a process at a node;

in response to said migrating said executable process from said certain node to said another node, sending an acceptance request from said certain node to said another node, setting a process for said executable process at said another node which receives the acceptance request to prepare for acceptance of said executable process, sending a ready notification from said another node to said certain node, sending said first information from said certain node, having received said ready notification, to said another node, starting execution of said process based on said received first information at said another node, having received said first information, and terminating said process of said executable process at said another node.

16. A data-processing method according to claim 13, further comprising updating prescribed information of the first and second information stored by the first and second information storing steps.

17. A data-processing method according to claim 13, wherein the generating step includes generating another plan representing another series of actions to be executed by the executable process according to the first and second information when it is impossible for the actions of the executable process to be executed at the designated node based on the plan generated by the generating step.

18. A data-processing method according to claim 13, further comprising updating the first and second information stored by the first and second information storing steps, wherein the updating step includes updating the first information based on the changed contents of the constituent elements, which are input at the each node, wherein the plan-generating step includes generating another plan representing another series of actions to be executed by the executable process according to the updated first and second information updated in the designated node by the updating step when the updated first and second information is inconsistent with the previous first and second information before the update and because of this inconsistency it is impossible for the actions of the executable process to be executed at the designated node based on the previous plan generated by the plan-generating step according to the previous first and second information.

19. A storage medium onto which is stored a computer program that implements a data-processing method for processing data by an executable process, the method comprising:

storing a first information representing a state of constituent elements to be accessed by the executable process;

storing a second information representing a series of actions to be executed by the executable process;

generating a plan representing the series of actions according to the first and second storage information, the series of actions including an action which implements a migration of the executable process between nodes;

executing the series of actions of the executable process at the node based on the generated plan;

migrating the executable process between the nodes designated in the generated plan; and generating another plan representing another series of actions to be executed by the executable process according to the first and second information after the migration of the executable process.

20. A storage medium according to claim 19, wherein the method further comprises updating prescribed information of the first and second information stored by the first and second information storing steps.

21. A storage medium according to claim 19, wherein the generating step includes generating another plan representing another series of actions to be executed by the executable process according to the first and second information when it is impossible for the actions of the executable process to be executed at the designated node based on the plan generated by the generating step.

22. A storage medium according claim 19, wherein the method further comprises updating the first and second information stored by the first and second information storing steps, wherein the updating step includes updating the first information based on the changed contents of the constituent elements, which are input at the each node, wherein the plan-generating step includes generating another plan representing another series of actions to be executed by the executable process according to the updated first and second information updated in the designated node by the updating step when the updated first and second information is inconsistent with the previous first and second information before the update and because of this inconsistency it is impossible for the actions of the executable process to be executed at the designated node based on the previous plan generated by the plan-generating step according to the previous first and second information.

23. A data-processing system for processing data by an agent being a series of software, the system comprising:

a plurality of nodes being connected by a network, each node including constituent elements being accessed by the agent, a first storage part configured to store a first information representing a state of the constituent elements;

a second storage part configured to store a second information representing series of actions to be executed by the agent;

a plan-generating part configured to generate a plan representing the series of actions according to the first and second storage information, the series of actions including an action which implements a migration of the agent between the nodes;

an execution part configured to execute the series of actions based on the generated plan; and a control part configured to migrate the agent between the nodes based on the generated plan, wherein said plan-generating part generates another plan representing another series of actions according to the first and second information after the migration of the agent.

24. A data-processing apparatus according to claim 23, wherein said information which is located at each said node is divided into a plurality of fields by each type of agent, and further wherein said agent plan is generated based on field information corresponding to said agent, and migration between nodes being performed so as to make migration of said agent to said corresponding field at said another node.

25. A data-processing apparatus according to claim 23 or claim 24, wherein said agent has information representative of characteristics state or an action of said agent, said information being migrated along with said agent when migration is made between nodes, said information being used together with said first information and said second information at said another node to perform planning.

26. A data-processing apparatus according to claim 23 or 24, wherein said plan-generating means, when generating a migration command that migrates an agent between nodes or another command as part of a plan, appends a pre-condition as a prerequisite to said migration command or said other command.

27. A data-processing apparatus according to claim 23 or 24, wherein said agent generates an intermediate subgoal for achieving a final goal, and generates a child agent for achieving said subgoal.

28. A data-processing apparatus according to claim 23 or 24, wherein when a plan execution or an agent migration fails, said execution means interrupts said plan execution, said plan-generating means generates another plan, and said execution means executes said another plan.

29. A data-processing apparatus according to claim 28, wherein when an action execution or migration fails during part of a plan, said plan-generating means generates a subgoal for recovering from the failed execution or migration, and after the completion of execution of said subgoal, information for restarting the execution of said plan is stored, a plan is generated based on said subgoal and executed, and after execution of the plan based on said subgoal, said stored information is used to continue said original plan.

30. A data-processing apparatus according to claim 23 or 24, further comprising a means for correcting information that caused the failure when a plan execution or migration based on a plan fails.

31. A data-processing apparatus according to claim 23, wherein said plan-generating means generates a new plan using said first and second information when it is impossible for the series of actions of the agent to be executed at the designated node based on the plan generated by the plan-generating means, and generating a new plan for the agent at the migration destination when said agent cannot execute its actions at the migration destination node.

32. A data-processing system according to claim 23, wherein the plan-generating part generates another plan representing another series of actions to be executed by the agent according to the first and second information when it is impossible for the actions of the agent to be executed at the designated node based on the plan generated by the plan-generating part.

33. A data-processing system according to claim 23, further comprising an updating part configured to update the first information stored in the first storage part and the second information stored in the second storage part, wherein the updating part updates the first information based on the changed contents of the constituent elements, which are input at each of the nodes, wherein the plan-generating part generates another plan representing another series of actions to be executed by the agent according to the updated first and second information updated in the designated node by the updating part when the updated first and second information is inconsistent with the previous first and second information before the update and because of this inconsistency it is impossible for the actions of the agent to be executed at the designated node based on the previous plan generated by the plan-generating part according to the previous first and second information.

34. A data-processing method for processing data by an agent being a series of software, the method comprising the steps of:

storing a first information representing a state of constituent elements to be accessed by the agent;

storing second information representing a series of actions to be executed by the agent;

generating a plan representing the series of actions according to the first and second storage information, the series of actions including an action which implements a migration of the agent between the nodes;

executing the series of actions of the agent based on the generated plan;

migrating the agent between the nodes designated in the generated plan; and generating another plan representing another series of actions to be executed by the agent according to the first and second information after the migration of the agent.

35. A data-processing method according to claim 34, further comprising dividing various information located at each said node into a plurality of fields by each type of agent, and said generating said agent plan is based on field information corresponding to said agent, and agent migrating between nodes includes migrating said agent to said corresponding field at the migration destination node.

36. A data-processing method according to either claim 34 or 35, wherein said generating a plan includes, when generating a migration command that migrates an agent between nodes or another command as part of a plan, appending a pre-condition as a prerequisite to said migration command or said other command.

37. A data-processing method according to claim 34 or 35, further comprising when a plan execution or an agent migration fails, interrupting said plan execution, and generating another plan and executing said another plan.

38. A data-processing method according to claim 24 or 35, further comprising when a plan execution or migration based on a plan fails, correcting information that caused the failure.

39. A storage medium storing therein a computer program that implements a data-processing method according to claim 34, further comprising dividing various information located at each said node into a plurality of fields by each type of agent, and said generating said agent plan based on field information corresponding to said agent, and agent migrating between nodes includes migrating said agent to said corresponding field at the migration destination node.

40. A data-processing method according to claim 34, wherein the generating step includes generating another plan representing another series of actions to be executed by the agent according to the first and second information when it is impossible for the actions of the agent to be executed at the designated node based on the plan generated by the generating step.

41. A data-processing method according to claim 34, further comprising updating the first and second information stored by the first and second information storing steps, wherein the updating step includes updating the first information based on the changed contents of the constituent elements, which are input at the each node, wherein the plan-generating part generates another plan representing another series of actions to be executed by the agent according to the updated first and second information updated in the designated node by the updating step when the updated first and second information is inconsistent with the previous first and second information before the update and because of this inconsistency it is impossible for the actions of the agent to be executed at the designated node based on the previous plan generated by the generating step according to the previous first and second information.

42. A storage medium storing therein a computer program that implements a data-processing method for processing data by an agent, the method comprising the steps of:

storing a first information representing a state of constituent elements to be accessed by the agent;

storing a second information representing a series of actions to be executed by the agent;

generating a plan representing the series of actions according to the first and second storage information, the series of actions including an action which implements a migration of the agent between the nodes;

executing the series of actions of the agent at the node based on the generated plan;

migrating the agent between the nodes designated in the generated plan; and generating another plan representing another series of actions to be executed by the agent according to the first and second information after the migration of the agent.

43. A storage medium according to claim 42, wherein the generating step includes generating another plan representing another series of actions to be executed by the agent according to the first and second information when it is impossible for the actions of the agent to be executed at the designated node based on the plan generated by the generating step.

44. A storage medium according to claim 42, wherein the method further comprises updating the first and second information stored by the first and second information storing steps, wherein the updating step includes updating the first information based on the changed contents of the constituent elements, which are input at the each node, wherein the plan-generating part generates another plan representing another series of actions to be executed by the agent according to the updated first and second information updated in the designated node by the updating step when the updated first and second information is inconsistent with the previous first and second information before the update and because of this inconsistency it is impossible for the actions of the agent to be executed at the designated node based on the previous plan generated by the generating step according to the previous first and second information.

* * * * *

UNITED STATES PATENT AND TRADEMARK OFFICE
CERTIFICATE OF CORRECTION

PATENT NO.    : 6,134,580
DATED         : October 17, 2000
INVENTOR(S)   : Yasuyuki Tahara et al.

It is certified that error appears in the above-identified patent and that said Letters Patent is hereby corrected as shown below:

Title page,
Item [57], ABSTRACT,
Line 3, after "stored" insert -- at nodes L and R connected to a network --;
Line 4, before "this", insert -- and --.

Column 44, claim 1,
Line 42, after "network", insert -- , -- (a comma).
Line 59, "plan." should read -- plan, --.

Column 45, claim 6,
Line 39, "makings" should read -- making --.

Column 45, claim 7,
Line 45, "claim 5" should read -- claim 4 --.

Column 45, claim 8,
Line 50, "claim 5" should read -- claim 4 --

Column 45, claim 9,
Line 57, "claim 5" should read -- claim 4 --.

Column 46, claim 11,
Line 18, after "means.", delete "node.".

Column 46, claim 14,
Line 57, "comprise s:" should read -- comprises: --.

UNITED STATES PATENT AND TRADEMARK OFFICE
CERTIFICATE OF CORRECTION

PATENT NO. : 6,134,580
DATED : October 17, 2000
INVENTOR(S) : Yasuyuki Tahara et al.

It is certified that error appears in the above-identified patent and that said Letters Patent is hereby corrected as shown below:

Column 48, claim 22,
Line 16, "according claim 19" should read -- according to claim 19 --.

Column 50, claim 38,
Line 33, "claim 24" should read -- claim 34 --.

Signed and Sealed this

Nineteenth Day of February, 2002

Attest:

JAMES E. ROGAN
*Director of the United States Patent and Trademark Office*

*Attesting Officer*